(12) United States Patent
Hu

(10) Patent No.: US 12,375,393 B2
(45) Date of Patent: Jul. 29, 2025

(54) GRACEFUL SWITCHOVER FOR MULTI-CHASSIS TRUNKING

(71) Applicant: Ruckus IP Holdings LLC, Claremont, NC (US)

(72) Inventor: Maocheng Hu, San Jose, CA (US)

(73) Assignee: Ruckus IP Holdings LLC, Claremont, NC (US), PART INTEREST ( * ) Notice: Subject to any disclaimer, the term of this patent is extended or adjusted under 35 U.S.C. 154(b) by 463 days.

(21) Appl. No.: 17/715,077

(22) Filed: Apr. 7, 2022

(65) Prior Publication Data

US 2022/0337512 A1 Oct. 20, 2022

Related U.S. Application Data

(60) Provisional application No. 63/175,634, filed on Apr. 16, 2021.

(51) Int. Cl.
| | |
|---|---|
| *H04L 45/247* | (2022.01) |
| *H04L 45/24* | (2022.01) |
| *H04L 45/28* | (2022.01) |
| *H04L 45/48* | (2022.01) |
| *H04L 45/745* | (2022.01) |

(52) U.S. Cl.
CPC .......... *H04L 45/247* (2022.05); *H04L 45/245* (2013.01); *H04L 45/28* (2013.01); *H04L 45/48* (2013.01); *H04L 45/745* (2013.01)

(58) Field of Classification Search
CPC .............................. H04L 24/245; H04L 45/28
See application file for complete search history.

(56) References Cited

U.S. PATENT DOCUMENTS

| | | | |
|---|---|---|---|
| 2014/0036924 A1* | 2/2014 | Christenson | H04L 12/4641 370/395.53 |
| 2018/0225140 A1* | 8/2018 | Titus et al. | G06F 9/5094 |
| 2019/0370376 A1* | 12/2019 | Demmon | G06F 11/2046 |
| 2021/0014118 A1* | 1/2021 | Thomas | H04L 49/40 |
| 2022/0052904 A1* | 2/2022 | Howard | H04L 47/41 |
| 2022/0091870 A1* | 3/2022 | Khan | G06F 8/656 |
| 2023/0291598 A1* | 9/2023 | Chari | H04L 45/586 |

* cited by examiner

*Primary Examiner* — Donald L Mills
(74) *Attorney, Agent, or Firm* — Steven Stupp

(57) ABSTRACT

A stacking system that includes multiple computer network devices (such as a switch or a router) is described. This stacking system may include: an active computer network device that implements software for control protocols and user configuration of the stacking system, and a standby computer network device that provides switchover backup for the active computer network device. During operation of the stacking system, when a switchover from the active computer network device to the standby computer network device occurs, at least the standby computer network device performs an action based at least in part on differences between system control tables for the active computer network device and the standby computer network device, wherein the action comprises: reprograming at least part of the system control tables; reprogramming at least part of hardware in the stacking system; or downloading at least the part of the system control tables to the hardware.

20 Claims, 9 Drawing Sheets

GRACEFUL SWITCHOVER FOR MULTI-CHASSIS TRUNKING

CROSS REFERENCE TO RELATED APPLICATIONS

This application claims priority under 35 U.S.C. 119(e) to: U.S. Provisional Application Ser. No. 63/175,634, "Graceful Switchover for Multi-Chassis Trunking," filed on Apr. 16, 2021, by Maocheng Hu, the contents of which are herein incorporated by reference.

FIELD

The described embodiments relate to techniques for providing hot standby or hitless switchover to a standby computer network device in a stacking system.

BACKGROUND

Multiple computer network devices or units (such as switches or routers) are sometimes aggregated in a stacking system. However, in a stacking system, not all of the computer network devices are equal. Instead, most control protocols and user configuration are executed at one computer network device, called an active unit or an active controller, and the remaining computer network devices are so-called 'member units.'

When a member unit goes down, the impact is normally limited to the local ports on that unit. However, when the active unit goes down, the impact is often much larger. Notably, the entire stacking system may fail or cease proper functioning even though the member units were not directly affected by the failure or administrative shutdown of the active unit.

In order to address this problem, in many stacking systems another computer network device is designated as a 'standby unit.' Then, when the active unit goes down (e.g., because of a crash or administratively), the standby unit may take over the active role and becomes the new active unit of the stacking system, thereby preventing failure of the stacking system. This process is called 'switchover.'

Many of the features in stacking systems hot standby or hitless switchover. This means that the switchover should have minimal impact on the customer experience including very minimal data traffic drop. However, it is often difficult to implement hot standby or hitless switchover in some stacking systems, such as those that implement an alternative to a spanning tree protocol. This can degrade the performance of the computer network devices and these stacking systems, and may result in dropped traffic.

SUMMARY

A stacking system that includes multiple computer network devices (such as a switch or a router) is described. This stacking system may include: an active computer network device that implements software for control protocols and user configuration of the stacking system; and a standby computer network device that provides switchover backup for the active computer network device. During operation of the stacking system, when a switchover from the active computer network device to the standby computer network device occurs, at least the standby computer network device performs an action based at least in part on differences between system control tables for the active computer network device and the standby computer network device, wherein the action comprises: reprograming at least part of the system control tables; reprogramming at least part of hardware in the stacking system; or downloading at least the part of the system control tables to the hardware; and wherein the system control tables comprise: a media access control (MAC) address table, a spanning tree group table, a link aggregation group table, or a port table with information associated with ports.

Note that the stacking system may implement a control protocol that protects against loops in a network by blocking ports, and that relearns network topologies when a link in the network fails. This control protocol may be different from a spanning tree protocol. For example, the control protocol may include multi-chassis trunking (MCT).

Moreover, the active computer network device and the standby computer network device have state machines for the stacking system that are based at least in part on a topology of the stacking system, so that the state machines converge to a common state even if the active computer network device and the standby computer network device execute different sequences of events. Note that the topology of the stacking system may include the user configuration and link events.

Furthermore, the stacking system may bi-cast control packets to the active computer network device and the standby computer network device.

Additionally, the port table may specify a subset of the ports that are enabled and a subset of the ports that are disabled.

Note that the spanning tree group table may specify blocking or forwarding of traffic and/or the link aggregation group table may specify a group of ports that are aggregated into a link.

In some embodiments, the action does not affect all of the system control tables. For example, the action may only affect the portion of the system control tables, such as the link aggregation group table and the spanning tree group table.

Moreover, the stacking system may implement distributed standby. Notably, the action may comprise downloading at least the portion of the system control tables to the multiple computer network devices, which may reprogram at least the portion of the system control tables or the hardware based at least in part on at least the downloaded portion of the system control tables.

Furthermore, the standby computer network device may delay, for a time interval, reprogramming of the spanning tree group table in order to avoid a layer 2 (L2) loop condition.

Another embodiment provides a computer-readable storage medium for use with the stacking system. When executed by the stacking system, this computer-readable storage medium causes the stacking system to perform at least some of the aforementioned operations.

Another embodiment provides a method, which may be performed by the stacking system. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
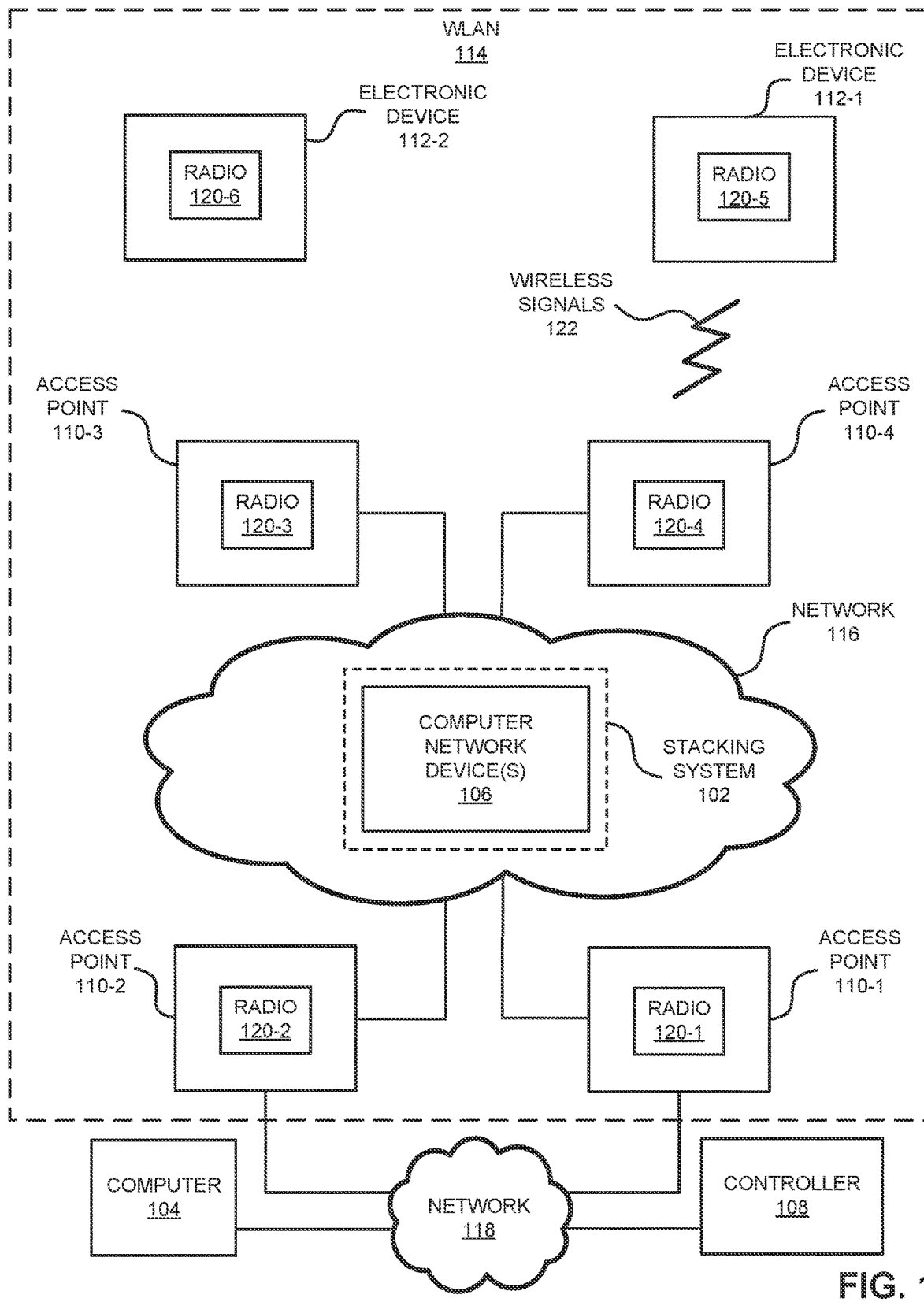
FIG. 1 is a block diagram illustrating an example of communication among access points and electronic devices in a network in accordance with an embodiment of the present disclosure.

A stacking system that includes multiple computer network devices (such as a switch or a router) is described. This stacking system may include: an active computer network device that implements software for control protocols and user configuration of the stacking system; and a standby computer network device that provides switchover backup for the active computer network device. During operation of the stacking system, when a switchover from the active computer network device to the standby computer network device occurs, at least the standby computer network device performs an action based at least in part on differences between system control tables for the active computer network device and the standby computer network device, wherein the action comprises: reprograming at least part of the system control tables; reprogramming at least part of hardware in the stacking system; or downloading at least the part of the system control tables to the hardware; and wherein the system control tables comprise: a media access control (MAC) address table, a spanning tree group table, a link aggregation group table, or a port table with information associated with ports.

By performing the operation, these switchover techniques may provide hot standby or hitless switchover in the stacking system. Notably, the switchover techniques may provide hardware and software synchronization between the active computer network device and the standby computer network device even when the stacking system implements a control protocol that is different from a spanning tree protocol. For example, the control protocol may include MCT. In the process, the switchover techniques may maintain the performance of the stacking system during a handover, and may reduce or eliminate lost or dropped traffic. Therefore, the switchover techniques may improve the user experience when using the stacking system.

In the discussion that follows, MCT may provide an alternative to spanning tree protocols. Spanning tree is a technology that protects a network against loops by blocking necessary ports, and having the network span to relearn topologies when a link fails in the network. MCT is a technology that allows two supporting computer network devices to cluster together and appear as a single logical device. Trunking is a technology that allows multiple links of a computer network device to appear as one logical link. The combination of MCT and trunking may provide a resilient network topology that uses some or all the links in the network, thereby creating a network topology for latency sensitive applications.

Moreover, static or dynamic link aggregation control protocol (LACP) trunks may provide link-level redundancy and increased capacity. However, the trunks may not provide computer-network-device-level redundancy. If the computer-network-device to which a trunk is attached fails, the entire trunk may lose network connectivity. Furthermore, two computer network devices may be needed for network resiliency with trunked links to both of the computer network devices. With spanning tree, one of these trunks may be blocked from use until the failure of the other trunk is detected, which may take between 1-30 seconds, potentially adding latency and jitter, not only on the affected computer network devices locally, but throughout the span topology. With MCT, member links of the trunk may be split and connected to two clustered MCT-supporting computer network devices. Additionally, MCT may include integrated loop detections, which allows all links to be active. If a failure is detected, traffic may be dynamically allocated across the remaining links. This failure detection and allocation of traffic may occur in sub-second time, without impact on the rest of the network.

Consequently, MCT may inherent the benefits of a trunk group and may allow multiple physical links to act as a single logical link. The resulting available bandwidth may be an aggregate of all the links in the group. Traffic may be shared across the links in the group using dynamic flow-based load balancing, and traffic may be moved to a remaining link group in sub-seconds if a failure occurs on one of the links. MCT may eliminate the single point of failure that exists at the computer-network-device level when all links of a trunk terminate on the same computer network device without the overhead associated with spanning tree. MCT may divert a subset of the links to a second computer network device to provide redundancy and sub-second fault detection at the computer-network-device level.

In the discussion that follows, an access point and/or an electronic device (such as a recipient electronic device, which is sometimes referred to as a 'client') may communicate packets or frames in accordance with a wireless communication protocol, such as an Institute of Electrical and Electronics Engineers (IEEE) 802.11 standard (which is sometimes referred to as 'Wi-Fi,' from the Wi-Fi Alliance of Austin, Texas), Bluetooth (from the Bluetooth Special Interest Group of Kirkland, Washington), and/or another type of wireless interface. In the discussion that follows, Wi-Fi is used as an illustrative example. For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies.

However, a wide variety of communication protocols (such as Long Term Evolution or LTE, another cellular-telephone communication protocol, etc.) may be used. The wireless communication may occur in one or more bands of frequencies, such as: a 900 MHz, a 2.4 GHz, a 5 GHz, 6 GHz, the Citizens Broadband Radio Spectrum or CBRS (e.g., a frequency band near 3.5 GHz), a band of frequencies used by LTE or another cellular-telephone communication protocol or a data communication protocol, and/or a 60 GHz frequency band. (Note that IEEE 802.11ad communication over a 60 GHz frequency band is sometimes referred to as 'WiGig.' In the present discussion, these embodiments also encompassed by 'Wi-Fi.') In some embodiments, communication between electronic devices may use multi-user transmission (such as orthogonal frequency division multiple access or OFDMA).

Moreover, the electronic device and/or the access point may communicate with one or more other access points and/or computers in a network using a wireless or a wired communication protocol, such as an IEEE 802.11 standard, an IEEE 802.3 standard (which is sometimes referred to as 'Ethernet') and/or another type of wired or wireless interface. In the discussion that follows, Ethernet is used as an illustrative example of communication between the electronic device and/or the access point and the one or more other access points and/or computers in the network.

FIG. 1 presents a block diagram illustrating an example of communication among one or more access points 110 and electronic devices 112 (such as a cellular telephone, and which are sometimes referred to as 'clients') in a WLAN 114 (which is used as an example of a network) in accordance with some embodiments. Access points 110 may communicate with each other in WLAN 114 using wireless and/or wired communication (such as by using Ethernet or a communication protocol that is compatible with Ethernet). Note that access points 110 may include a physical access point and/or a virtual access point that is implemented in software in an environment of an electronic device or a computer. In addition, at least some of access points 110 (such as access points 110-3 and 110-4) may communicate with electronic devices 112 using wireless communication.

The wired and/or wireless communication among access points 110 in WLAN 114 may occur via network 116 (such as an intra-net, a mesh network, point-to-point connections and/or the Internet) and may use a network communication protocol, such as Ethernet. For example, WLAN 114 may include one or more computer network devices 106 (e.g., a switch or a router). In some embodiments, the one or more computer network device 106 may include a stacking system 102 of multiple computer network devices (which are sometimes referred to as 'stacking units'). This stacking system may designate one of computer network devices 106 as an active computer network device and one or more of the remaining computer network devices 106 as a standby computer network device. The active computer network device may software for control protocols and user configuration of the stacking system, and the standby computer network device may provide switchover backup for the active computer network device.

Furthermore, the wireless communication using Wi-Fi may involve: transmitting advertising frames on wireless channels, detecting one another by scanning wireless channels, establishing connections (for example, by transmitting association or attach requests), and/or transmitting and receiving packets or frames (which may include the association requests and/or additional information as payloads). In some embodiments, the wired and/or wireless communication among access points 110 also involves the use of dedicated connections, such as via a peer-to-peer (P2P) communication technique. Therefore, access points 110 may support wired communication outside of WLAN 114 (such as Ethernet) and wireless communication within WLAN 114 (such as Wi-Fi), and one or more of access points 110 may also support a wired communication protocol for communicating via network 118 with electronic devices (such as a computer 104 or a controller 108 of WLAN 114, which may be remoted located from WLAN 114).

Figure 9:
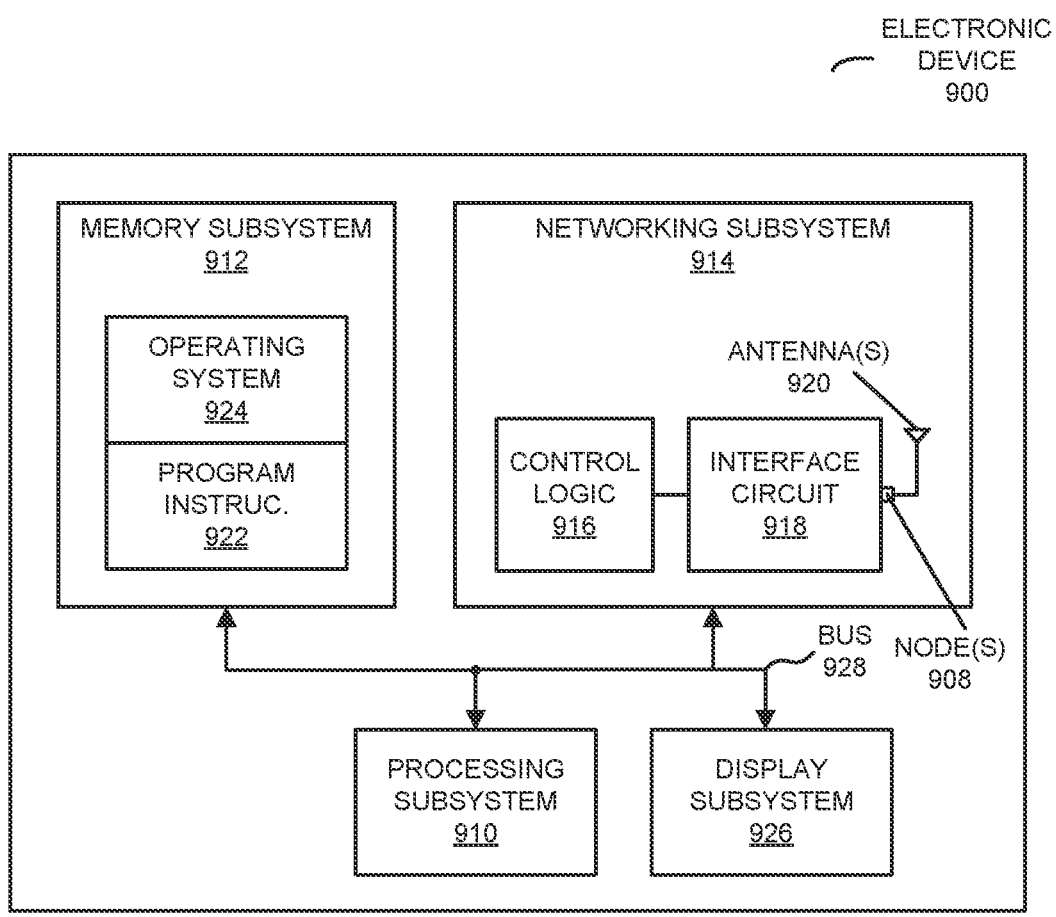
FIG. 9 is a block diagram illustrating an example of an electronic device in accordance with an embodiment of the present disclosure.

As described further below with reference to FIG. 9, the one or more computer network device 106, access points 110 and/or electronic devices 112 may include subsystems, such as a networking subsystem, a memory subsystem and a processor subsystem. In addition, access points 110 and electronic devices 112 may include radios 120 in the networking subsystems. More generally, access points 110 and electronic devices 112 can include (or can be included within) any electronic devices with the networking subsystems that enable access points 110 and electronic devices 112 to communicate with each other using wireless and/or wired communication. This wireless communication can comprise transmitting advertisements on wireless channels to enable access points 110 and/or electronic devices 112 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 120 are shown in access points 110 and electronic devices 112, one or more of these instances may be different from the other instances of radios 120.

As can be seen in FIG. 1, wireless signals 122 (represented by a jagged line) are transmitted from radio 120-4 in access point 110-4. These wireless signals may be received by radio 120-5 in electronic device 112-1. Notably, access point 110-4 may transmit packets or frames. In turn, these packets or frames may be received by electronic device 112-1. Moreover, access point 110-4 may allow electronic device 112-1 to communicate with other electronic devices, computers and/or servers via networks 116 and/or 118.

Note that the communication among access points 110 and/or with electronic devices 112 (and, more generally, communication among components in WLAN 114) may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in access points 110 and electronic devices 112 includes: receiving signals (such as wireless signals 122) corresponding to the packet or frame; decoding/extracting the packet or frame from received wireless signals 122 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously, it may be difficult to implement hot standby or hitless switchover in some stacking systems, such as those that implement an alternative to a spanning tree protocol (e.g., MCT). As described further below with reference to FIGS. 2-5, in order to address these problems, the one or more computer network devices 106 may implement the switchover techniques. Notably, in stacking system 102, one of computer network devices 106 may be an active computer network device that implements software for control protocols and user configuration of stacking system 102, and at least another one of computer network devices 106 may be a standby computer network device that provides switchover backup for the active computer network device. During operation of stacking system 102, when a switchover from the active computer network device to the standby computer network device occurs, at least the standby computer network device performs an action based at least in part on differences between system control tables for the active computer network device and the standby computer network device. This action may include: reprograming at least part of the system control tables, reprogramming at least part of hardware in the stacking system; or downloading at least the part of the system control tables to the hardware.

Note that the system control tables may include: a MAC address table with MAC addresses of electronic devices in a network, a spanning tree group table that specifies blocking or forwarding of traffic, a link aggregation group table that specifies a group of ports that are aggregated into a link, and/or a port table with information associated with ports. For example, the port table may specify a subset of the ports that are enabled and/or a subset of the ports that are disabled.

In some embodiments, the action does not affect all of the system control tables. For example, the action may only affect the portion of the system control tables, such as the link aggregation group table and/or the spanning tree group table.

Note that stacking system 102 may implement a control protocol that protects against loops in the network by blocking ports, and that relearns network topologies when a link in the network fails. This control protocol may be different from a spanning tree protocol. For example, the control protocol may include MCT. Moreover, the active computer network device and the standby computer network device may have state machines for stacking system 102 that are based at least in part on a topology of stacking system 102, so that the state machines converge to a common state even if the active computer network device and the standby computer network device execute different sequences of events (such as different sequences of commands). In some embodiments, the topology of stacking system 102 may include the user configuration and link events. Furthermore, stacking system 102 may bi-cast control packets to the active computer network device and the standby computer network device.

Additionally, stacking system 102 may implement distributed standby. Notably, the action may comprise downloading at least the portion of the system control tables to the multiple computer network devices 106, which may reprogram at least the portion of the system control tables or the hardware based at least in part on at least the downloaded portion of the system control tables.

In some embodiments, the standby computer network device may delay, for a time interval (such as 6 s), reprogramming of the spanning tree group table in order to avoid a L2 loop condition.

In this way, stacking system 102 may implement the switchover techniques using one or more of computer network devices 106. Consequently, the switchover techniques may improve the performance of the one or more computer network devices 106 and/or stacking system 102, and may reduce or eliminated dropped traffic. Therefore, the switchover techniques may improve the user experience when using the one or more computer network devices 106 and/or stacking system 102.

Figure 2:
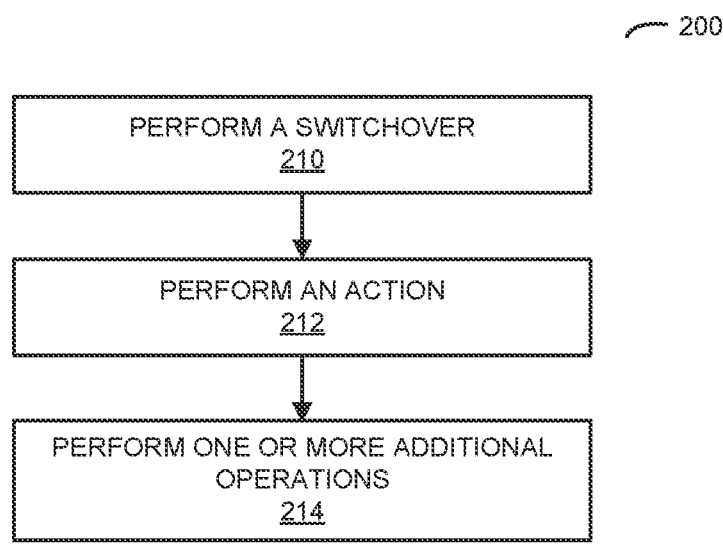
FIG. 2 is a flow diagram illustrating an example of a method for performing a switchover in a stacking system in FIG. 1 in accordance with an embodiment of the present disclosure.

We now describe embodiments of a method. FIG. 2 presents a flow diagram illustrating an example of a method 200 for performing a switchover in a stacking system in accordance with some embodiments. This method may be performed by a computer network device (such as one of the one or more computer network devices 106 in FIG. 1) in the stacking system.

During operation, the stacking system may perform a switchover (operation 210) from an active computer network device to a standby computer device in the stacking system. Moreover, at least the standby computer network device performs an action (operation 212) based at least in part on differences between system control tables for the active computer network device and the standby computer network device, where the action includes: reprograming at least part of the system control tables; reprogramming at least part of hardware in the stacking system; or downloading at least the part of the system control tables to the hardware. Note that the system control tables may include: a MAC address table, a spanning tree group table, a link aggregation group table, and/or a port table with information associated with ports.

Furthermore, the port table may specify a subset of the ports that are enabled and a subset of the ports that are disabled. Additionally, the spanning tree group table may specify blocking or forwarding of traffic and/or the link aggregation group table may specify a group of ports that are aggregated into a link.

In some embodiments, the action does not affect all of the system control tables. For example, the action may only affect the portion of the system control tables, such as the link aggregation group table and/or the spanning tree group table.

In some embodiments, the stacking system performs one or more optional additional operations (operation 214). For example, the stacking system may implement a control protocol that protects against loops in a network by blocking ports, and that relearns network topologies when a link in the network fails. This control protocol may be different from a spanning tree protocol. Note that the control protocol may include MCT.

Moreover, the active computer network device and the standby computer network device have state machines for the stacking system that are based at least in part on a topology of the stacking system, so that the state machines converge to a common state even if the active computer network device and the standby computer network device execute different sequences of events. Note that the topology of the stacking system may include the user configuration and link events.

Furthermore, the stacking system may bi-cast control packets to the active computer network device and the standby computer network device.

Moreover, the stacking system may implement distributed standby. Notably, the action may comprise downloading at least the portion of the system control tables to the multiple computer network devices, which may reprogram at least the portion of the system control tables or the hardware based at least in part on at least the downloaded portion of the system control tables.

Furthermore, the standby computer network device may delay, for a time interval (such as 6 s), reprogramming of the spanning tree group table in order to avoid a L2 loop condition.

In some embodiments of method 200, there may be additional or fewer operations. Furthermore, the order of the operations may be changed, and/or two or more operations may be combined into a single operation.

Figure 3:
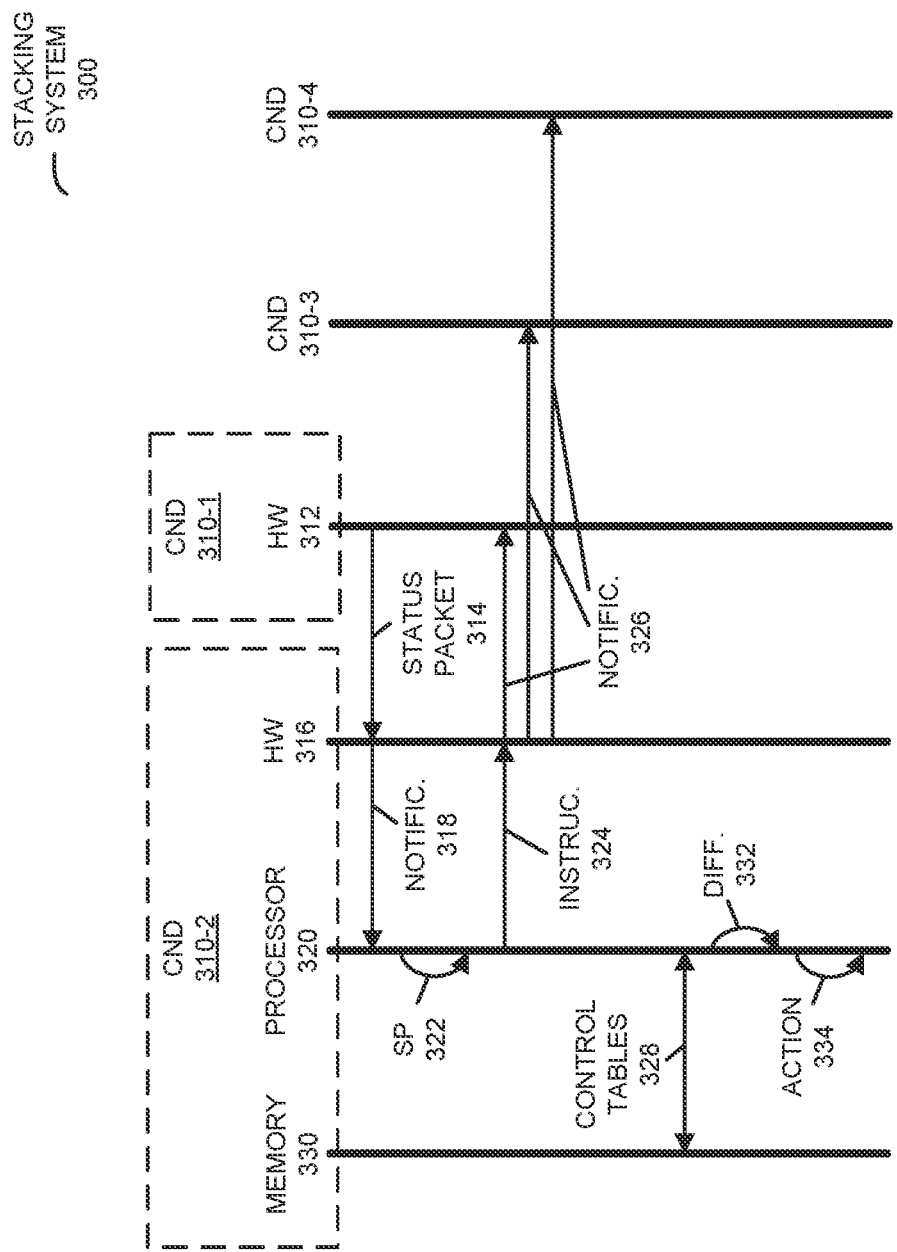
FIG. 3 is a drawing illustrating an example of communication among components in a stacking system in FIG. 1 in accordance with an embodiment of the present disclosure.

FIG. 3 presents a drawing illustrating an example of communication among components in stacking system 300 in accordance with some embodiments. This stacking system may include multiple computer network devices 310. Computer network device 310-1 may by an active computer network device in stacking system 310, and computer network device 310-2 may be a standby computer network device.

When a failure or administrative shutdown of computer network device 310-1 occurs, computer network device 310-2 may assume or takeover the role of the active computer network device. For example, hardware (HW) 312 in computer network device 310-1 may communicate a status packet 314 (such as a link down event) to hardware 316 (such as a linecard) in computer network device 310-2.

Moreover, when status packet 314 is received, hardware 316 may provide notification 318 to processor 320 in computer network device 310-2. In response, processor 320 may perform a switchover procedure (SP) 322. This may include instructing 324 interface circuit 316 to provide notifications 326 to the remaining computer network devices 310 in stacking system 300 (including computer network devices 310-1, 310-3 and 310-4) that computer network device 310-2 is now the active computer network device.

Furthermore, processor 320 may access system control tables 328 in memory 330 in computer network device 310-2. These system control tables 328 may include the current views of the system control tables of computer network device 310-2 and current hardware settings in stacking system 300. Then, processor 320 may determine differences 332 between the view of system control tables 328 of computer network device 310-2 and the hardware settings in stacking system 300. Next, based on differences 332, processor 320 may perform an action 334. For example, processor 320 may reprogram at least part of system control tables 328 of computer network device 310-2 or hardware of stacking system 300. Alternatively or additionally, processor 320 may instruct hardware 316 to download at least the part of the system control tables (e.g., from or associated with computer network device 310-2) to at least some of the hardware of stacking system 300 and/or the other computer network devices 310 in stacking system 300.

While FIG. 3 illustrates communication between components using unidirectional or bidirectional communication with lines having single arrows or double arrows, in general the communication in a given operation in these figures may involve unidirectional or bidirectional communication.

We now further describe the switchover techniques. Trunking (which is sometimes referred to as 'link aggregation') is a technology that allows multiple links of an electronic device to appear as one logical link. MCT allows two MCT-supporting computer network devices (such as two switches) to cluster together and appear as a single logical electronic device to the client switch link aggregation interface. The combination of MCT and trunking allows a resilient network topology that utilizes all links in the network to created, thereby providing an ideal network topology for latency sensitive applications. However, MCT is a major L2 feature that lacks of support for graceful switchover. The disclosed switchover techniques address this problem and provide a solution to support graceful switchover for MCT in a stacking system.

In order to support graceful switchover or hot standby support, a stacking system should have an active control module and a standby control module. When active control module goes down administratively or fails, the standby module can take over the control and continue provide seamless service to the customer.

The stacking system may include one to several stacking units that are connected by one or more high-speed stacking cables for interunit data traffic forwarding and inter-process communication (IPC) message. Moreover, each stacking unit may have its own hardware for wire-speed switch function and a control central processing unit (CPU) or processor. The unit (CPU)-to-unit (CPU) communication may be implemented by the in-band IPC through the one or more stacking cables. Furthermore, a software module (which is sometimes referred to as a 'linecard controller' or LC) may present in each and every unit as the interface between hardware driver and the high-level software modules. The linecard controller may view all the ports on the local unit as local ports starting with index 0. It may also know its own unit identifier, so that a mapping from a system port identifier to a local port identifier can be performed. For example, port 1/1/1 on unit 1 and port 2/1/1 on unit 2 may both be considered as local port 0 by their respective LCs.

In some embodiments, all centralized protocol and user interface code are not running in any one of the stacking units. Moreover, when a stacking unit is removed or is reset, only the traffic going through that stacking unit may be affected.

Furthermore, the high-level software module (including the centralized protocol and a centralized data structure (which may include information associated with a virtual local area network, a link aggregation group, ports and/or user interfaces) may be running in the active unit. The system view may be translated into the linecard control view in the linecard control layer, and then may be used to set the hardware.

The system control and linecard control architecture may be used to enable/disable a port. For example, a stacking system may include three stacking units (units 1, 2 and 3). Stacking unit 1 may currently be active, stacking unit 2 may be standby, and stacking unit 3 may be a member. In order to disable the user port 2/1/1, the system control layer in stacking unit 1 (which owns the port data structure) may mark port 256 (its system port identifier) as disabled, and may send this information to stacking unit 2. The linecard controller in stacking unit 2 may translate port 256 to its linecard control port identifier 0 and may make its local linecard control port 0 be administrator disabled. Moreover, the linecard controller in stacking unit 2 may knows local port 0 maps to specific hardware (device=2, device_port=2), and then may set the hardware register using this device and device_port. Because both system control and linecard controller may keep track of this port administrator status, multiple setting of the same value may be blocked, and hardware disturbance caused by multiple setting of the same value can be avoided.

Besides avoiding multiple setting, the system control and linecard control solution solves software-to-hardware mapping so that high-level software can be mostly hardware abstract. Moreover, changing a vendor of switch hardware may now be a relative straight forward process. Notably, by replacing the driver to linecard control layer, a majority of the standard switch function will naturally work. This architecture may also make distributed protocol implementation (such as distributed unidirectional link detection/link operations, administration and management, link aggregation control protocol) possible, and may also be a key factor in making the switchover easy and 'graceful'.

In some embodiments, an active unit may be defined as the one unit that runs all centralized control protocol and terminates the user control interface. Stated differently, in the current stacking system architecture, the centralized protocol and control system table(s) may be managed by one particular unit, the active unit, which is also a stacking unit. Moreover, in the present discussion, 'switchover' means that active unit gives control of these protocols and control system tables to another stacking unit, which is called the standby unit.

However, this is not the only possible design. For example, assume a new system is designed with the control protocol and user interface being terminated in a cloud-based sever that communicates with the stacking unit using inter-packet communication (IPC). This cloud-based server may perform the functions of the 'active unit' and all of the stacking units may just be 'member unit' (i.e., there is no 'active stacking unit'). When the remote cloud-based server crashes or is off-line, there needs to be 'standby' sever ready to takeover. In such a system, the graceful switchover requirement is still there, it will just be active server to standby sever switchover instead of active unit to standby unit switchover.

We now discuss how switchover may be implemented. In one solution, everything may be reloaded when the active unit crashed. Notably, when the active unit crashes, one way to handle this is to reload the whole system. Consequently, all units of the stacking system may reboot and reform the stack, and then may rejoin the network and let the network protocol re-converge. This solution may mean that all traffic gets dropped for the locally connected hosts, and may also mean a big network topology change/flap.

Naturally then, we would like to pick up a member unit to be a dedicated standby unit and allow the standby unit to take over as the active unit when the current active unit crashes in order to reduce the traffic loss caused over the aforementioned 'reload everything solution'. Note that 'takes over' may mean start to control all the hardware programming and user interfaces. In order to do so, the software state of the new active unit may need to be synchronized with the hardware state.

Alternatively, in another solution, the CPU of the active unit may be cloned. Notably, because we decided to choose a member unit as a standby unit, one idea is to have a CPU clone technology to clone the CPU of active unit using the local CPU of this member unit. If we have a technology to copy the CPU, all registers, all the timers, all the memory allocation, then basically we will pick a member unit as standby and its CPU would be a clone of the CPU of the active unit. When the CPU in the active unit is reset or crashes, the standby unit can take over easily, because the status of the CPU of the active unit may reflect the view of the whole stacking system, while the standby unit is 100% the same as active unit. Consequently, the software layer will not be out of synchronization or software and hardware will not be out of synchronization. However, such technology does not exist today and, even if it did exist, may not be a good idea to for graceful switchover.

Notably, even if such technology existed, one obvious issue is that every unit will have its own driver layer. Thus, when port 1/1/1 in the active unit is disabled, its driver for port 0 may be set as disable, while port 0 in member unit 1 is not disabled. However, if you clone the CPU, that will cause 2/1/1 to also be disabled in member unit 1, which is not acceptable.

Also, if the CPU in the active unit is cloned, this means all the bugs and limitations the CPU in the active unit encounters are cloned. Consequently, when the CPU in the active unit crashes, the standby unit may not be able to simply takeover because it will also crash due to the complete cloning.

In a third solution, a member unit may be designed as a standby unit and may perform a cold start. Notably, we need to have a solution to handle active unit crashes without reload the whole system. The natural idea is to pick another member unit as a standby unit, and let the standby unit takeover as active when the active unit crashes.

However, the standby unit is just a member unit without running any centralized control protocol or owning any central table(s). When this standby unit takes over as active, it would have to build the network topology from scratch. As the new active unit, it needs to take control of the whole stacking hardware at some point. Because the new active unit starts from scratch, its control protocol view would pretty much be all initialization status and be very different from the just-crashed previous active unit. Letting the new active unit use this 'all initialization' view to write to the hardware may cause traffic drop. Moreover, because this new active unit suddenly shows up in the network without the knowledge and runtime status of the previous active unit, its peer could easily find that these problems and trigger a network reconverge.

Consequently, in this solution, a member unit is picked as the standby unit and it performs a cold restart whenever it becomes active. Locally, it will set the hardware to a state very different from the previous active unit and may cause traffic drop. From the protocols view, it may also cause a peer to reconverge.

In a fourth solution, a more advanced hot standby is used. In the preceding discussion, we reviewed several possible system solutions for active crash from reloading the whole system to choose a member unit as standby and performing a cold start. In this solution, instead of having the standby unit perform a cold restart, it may be in a 'hot standby' condition that is very close to the active unit. This means the standby unit runs all the high-level applications just like the active unit and run into states that are also very similar to the active unit.

Note that in a hot standby condition, the standby unit runs all centralized control protocol and builds all centralized tables just like active unit. Moreover, the control protocol states of the standby unit are all very close to those of the active unit. However, the protocol decision of the standby unit does not trigger hardware programming and it cannot exchange control protocol packet data units with peer switches. The low level of the software on standby are just like any member unit, directly mapped to its hardware and controlled by the active unit.

If the hot standby condition can be achieved, when the active unit crashes, the standby unit can take over and rewrite the hardware of the system using its view. Because its state is very close to that of the active unit, we can minimize the traffic drop for customers. Moreover, because the state of the standby unit is very close to the active unit, the likelihood that a peer switch can detect this switchover and trigger control protocol reconverge is also reduced.

Consequently, the standby unit should now behave like a follower of the active unit. When the active unit forwards the traffic, the standby unit does the same. Moreover, when the active unit blocks the traffic, the standby unit will also follow. Furthermore, when the active unit crashes, the standby unit becomes the new boss and uses its state, which is very similar to the previous active unit, to rewrite the hardware so it starts the total control of the system. This whole process will have minimal user disturbance and is referred to as 'graceful switchover.'

In this solution, there are two principal parts of the design. The first part is hot standby, which is basically how to let the standby unit run into a state that is very similar to the active unit. The second part is re-painting, which is basically how to re-write the hardware efficiently without disturbing the traffic.

There are several elements in hot standby. Notably, there are three views: the active view, the standby view, and the local view. Every unit (including the active unit and the standby unit) has its local view, which is the linecard control setting/status in the stacking system. For example, for port 2/1/1, its actual device is 2 and the device_port is also 2. Member unit 2 may know exactly the local setting of this port. The local view may only cover the local resources, so member unit 2 does not have the port status of port 3/1/1 in its local view.

Moreover, the active view is the global view of the system resources by the active unit. In the stacking system, this may be included in the system control layer in the active unit. For example, the active unit may know the settings in its system control table for both 2/1/1 and 3/1/1, even though those ports are not actually on the active unit.

Furthermore, the standby view is the global view of the system resources by the standby unit. In the stacking system, this may be included in the system control layer in the standby unit. For example, the standby unit may know the settings in its system control table for all the ports, even though some are local and some are remote.

In this design, the control protocol in the active unit and the standby unit may run independently, so that the active view and the standby view are different. However, bi-cast and state-machine design may be used to make sure that the active view and standby view can converge and that they remain very close to each other.

Figure 4:
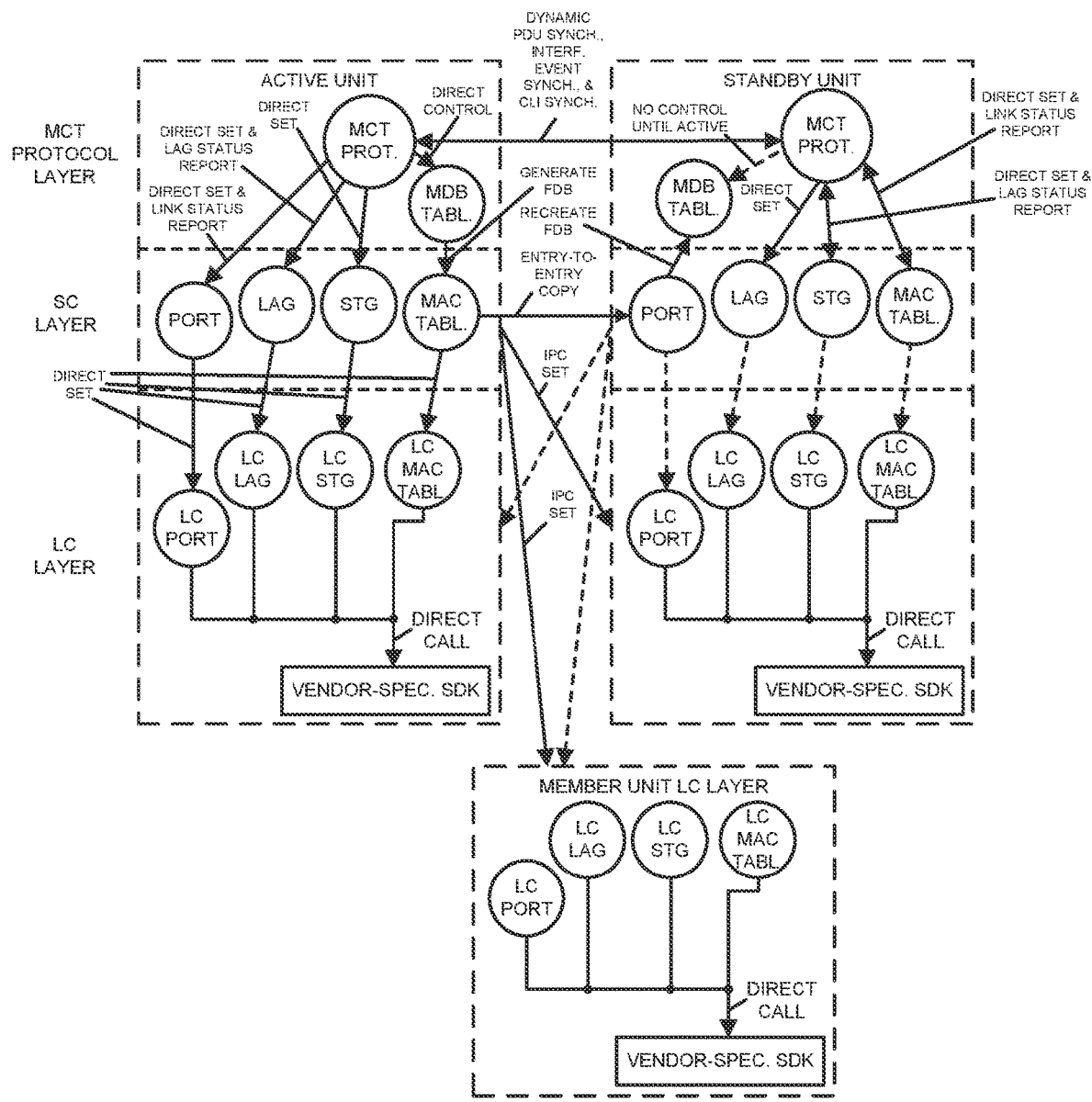
FIG. 4 is a drawing illustrating an example of communication among components in a stacking system in FIG. 1 in accordance with an embodiment of the present disclosure.

FIG. 4 presents a drawing illustrating an example of communication among components in stacking system 102 (FIG. 1). Note that the system controller layer in the standby unit does not have control over a remote linecard (e.g., in the active unit or the member unit) until it becomes the new active unit and repaints or reprograms the remote linecard. Similarly, the system controller layer in the standby unit does not have control over the local linecard in the standby unit it becomes the new active unit and repaints or reprograms the local linecard resources. This absence of control until it becomes the new active unit is illustrated using the dashed arrows in FIG. 4. Moreover, note that the member unit does not have a system controller.

There are several challenges associated with supporting hit standby. Notably, the state-machine design may be changed from transition-oriented to state-oriented. Consequently, when there the active unit and the standby unit are out of synchronization in the last minute and a re-paint is required to solve the discrepancy, it can be easily performed because now we know exactly the setting requirements of a given state.

In contrast, previously there was no state setting for any particular state. Instead, a transition description was implemented like 'when changing from state A to state B, what needs to be done.' However, this operation is prone to bugs, because there are so many possibilities and without clearly knowledge of what is the setting is for the final state, it is often literally impossible to maintain the transit code. For example, changing from state A to state B may require a change three items (X, Y and Z), while changing from state C to state B may require changing two things (Y and Z). The assumption may be that state C may only come from state A. However, when the design changes, state C may come from other state. In this case, no one will know this occurred.

In the switchover techniques, the new design clearly defines every state (in a state table) and the associated state setting requirement. When the standby unit switches into the active unit, the standby unit just repaint its state to all the stacking units. No further action is needed.

As noted previously, in the switchover techniques, the stacking system may bi-cast messages and events. Notably, the new design may send all MCT control messages and events to both the active unit and the standby unit. However, the standby unit may not be allowed to send control packets to its peer, so that the state-machine modification can be limited (without too much active unit/standby unit deviation). As discussed previously, in order for a graceful switchover to succeed, the standby unit needs to be as synchronized with the active unit as possible, and the difference with the hardware needs to be resolved when the standby unit turns into the active unit. Different embodiments may use different approach to achieve this. In the narrow sense, bi-cast may be used to send control packets to both the active unit and the standby unit. More generally, bi-cast may include sending critical events to the standby unit and the active unit at the same time. The idea is for the active unit and the standby unit to run the protocol state machine as if they are all active, and to process the same events, which include the control packets and events, such as a link event. If the state-machine design is proper, the protocol will converge by itself and the standby unit can be synchronized with the active unit given enough time.

Of course, the synchronization is not be permanent. There may be consistent out-of-synchronization conditions between the active unit and the standby unit. One reason for this is that they are running different timers. For example, one timer may be running in both the active unit and the standby unit. If the active unit ages out 0.001 s before the standby unit, then at that moment the active unit and the standby unit are no longer synchronized.

In the switchover techniques, the chaotic consistent and continuous out-of-synchronization conditions may be ignored. Instead, the focus may be on the user experience, so that the customer does not notice a switchover or the impact is limited.

We now discuss converging the state-machine design and periodic control packets. In order to allow bi-cast to work, the state-machine design may be self-converging instead of path-dependent. This means that, no matter the sequence of events, if the topology is the same, the final state will always be the same.

Most L2 control protocols use converging state machines. For example, the final forwarding map in the spanning tree protocol may be fixed by link status, bridge identifier and priority, and port identifier. Regardless of the bridge protocol data unit and link event sequence, the path to reach the final forwarding map can be very different, while the final forwarding map is always the same.

Moreover, a port error disable feature may follow a path dependent state machine. Thus, what has happened has already happened. When a standby unit is assigned, those ports that are already in an error disabled state will never get an error disable violation again. If the active unit gets a violation event and error disables the port, then, when the standby unit comes up, it will never get this violate event and the final result will be very different. Consequently, a path-dependent state machine cannot use bi-cast to achieve graceful switchover.

The previous MCT design was not totally self-converging, especially the cluster communication protocol (CCP) down (CD) part of the design was path-dependent. (Note that cluster communication protocol is between MCT peers and is based on the transmission control protocol.) This means that the standby unit and the active unit can easily go to different final states depending on the event sequence. Consequently, this is not a good candidate for bi-cast design. This is a reason for not previously supporting hitless switchover for MCT.

Besides the state-machine-level change, the control packet may need to be modified and sent periodically. Previously, the send-one reliable control message to a peer may not be suitable for bi-cast.

Moreover, some of the state transitions may be based on control messages from a peer involving handshakes. However, because the standby unit cannot send out control packets, the handshake design may not converge in the standby unit. A wait while timer may be introduced into the CD part of client state machine, so that a state transition does not totally rely on the response form the peer. For example, if the standby unit is introduced two months after the active unit is running with a stable MCT environment, its MCT peer may periodically send exchange control packets to the active unit. However, the standby unit may not be able to send control packets, so handshake with the peer becomes impossible. The wait while timer may solve this problem by simply waiting for the next state, instead of fast tracking into the next state using control packets.

In bi-cast design, the active unit and the standby unit may converge by independently running the same protocol stack. The protocol may require system resources at any time and may cause resources to be out of synchronization between the active unit and the standby unit. For example, at a given time, the MCT protocol on the active unit uses three link aggregation group entries (3, 5 and 8), while on the standby unit it may only uses two link aggregation group entries (2 and 3). Even for link aggregation group entry 3, the active unit may use it for client 5, while the standby unit may use it for client 6. Table 1 is an example illustrating out-of-synchronization resources.

TABLE 1

| Software Index of the Entry | Link Aggregation Group Table for the Active System Control | Link Aggregation Group Table for the Standby System Control |
|---|---|---|
| 1 | | |
| 2 | | Entry 2 is used for client 2, hardware index is 2 |
| 3 | Entry 3 is used for client 5, hardware index is 10 | Entry 3 is used for client 6, hardware index is 23 |
| 4 | | |
| 5 | Entry 5 is used for client 2, hardware index is 3 | |
| 6 | | |
| 7 | | |
| 8 | Entry 8 is used for client 6, hardware index is 4 | |

Here the index of the entry can be a software entry and with a hardware entry index as part of the entry contents (shown in Table 1). Alternatively, it can be a software entry that always matches with the hardware entry, so it can be considered as a hardware entry that is used to directly program a computer network device. If we let this condition continue without intervention, the topology of the active unit and the standby unit topology may eventually converge. However, the resource allocation may never converge. When the switchover time comes, the resource table of the active unit and the standby unit may be completely out of synchronization, which leads to an inevitable total repaint of the hardware table solution. This bad for the traffic flow of the user.

For a resource that will be allocated by protocols using bi-cast as a mechanism for hot standby, we would need extra effort to make sure the above condition would not occur. Table 2 presents an example of another way the link aggregation group table of the standby unit can be organized. While this is still different from the link aggregation table of the active unit, it is much closer. For example, entries 5 and 8 on the standby unit are the same as the entries for the active unit both for usage and the hardware index.

TABLE 2

| Software Index of the Entry | Link Aggregation Group Table for the Active System Control | Link Aggregation Group Table for the Standby System Control |
|---|---|---|
| 1 | | |
| 2 | | |
| 3 | Entry 3 is used for client 5, hardware index is 10 | |
| 4 | | |
| 5 | Entry 5 is used for client 2, hardware index is 3 | Entry 5 is used for client 2, hardware index is 3; |
| 6 | | |
| 7 | | |
| 8 | Entry 8 is used for client 6, hardware index is 4 | Entry 8 is used for client 6, hardware index is 4 |

Figure 5:
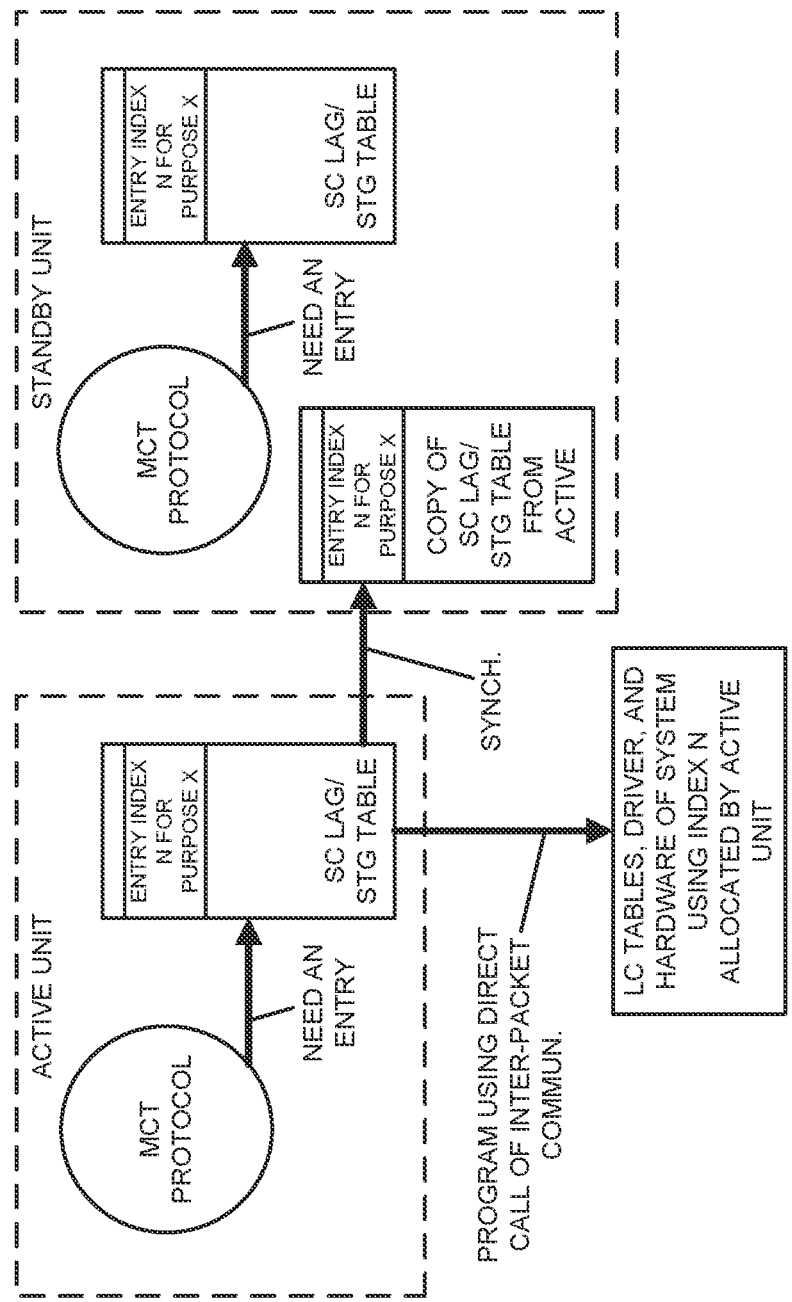
FIG. 5 is a drawing illustrating an example of communication among components in a stacking system in FIG. 1 in accordance with an embodiment of the present disclosure.

When the standby unit turns into the active unit, it would have only one entry different for the linecard control and the hardware. Therefore, the repainting or reprogramming may be much easier (just download its system control link aggregation group table, so that every linecard control link aggregation group table may find entry 3 needs to be deleted). FIG. 5 presents a drawing illustrating an example of communication among components in stacking system 102 (FIG. 1), including the system control (SC) link aggregation group (LAG) and spanning tree group (STG) table.

In some embodiments of the switchover techniques, the active unit may always synchronize its resource table to the standby unit. Notably, each entry may be marked with a unique reason that can be identified, e.g., entry 3 is used for client 5. Because each client uses up to one entry, this is a unique way to identify the resource and its user. For a link aggregation group, the synchronization table on the standby unit may be called a 'copy of the active link aggregation group table.'

When the protocol runs on the standby unit, it may need to allocate resources. It may first check the 'copy of the active link aggregation group table' to see whether the information is there. For example, when the standby unit tries to allocate a link aggregation group entry for client 2, it may check this table and find active unit use entry 5. If there is existing information on the active unit and the same table entry is free on the standby unit, the standby unit may just use this entry. Alternatively, if there is existing information on the active unit and the same table entry is not free on the standby unit, the standby unit may have to allocate an unused entry and perform a swap, so that this entry becomes free and then use it.

Moreover, the free logic on the active unit and the standby unit may run independently. Furthermore, the software table index may be the same as the hardware table index.

We now describe the state-machine design to support hot standby. There are two kinds of state machines and different state setting in the design. Notably, there is a per-client state machine (which can also be segmented into the CCP up (CU) and the CD data portions) and a (per) peer state machine. Every MCT client may run its own client state machine and there may only be one peer state machine for each MCT node. The output of the peer state machine may be part of the input of client state machine.

Figure 6:
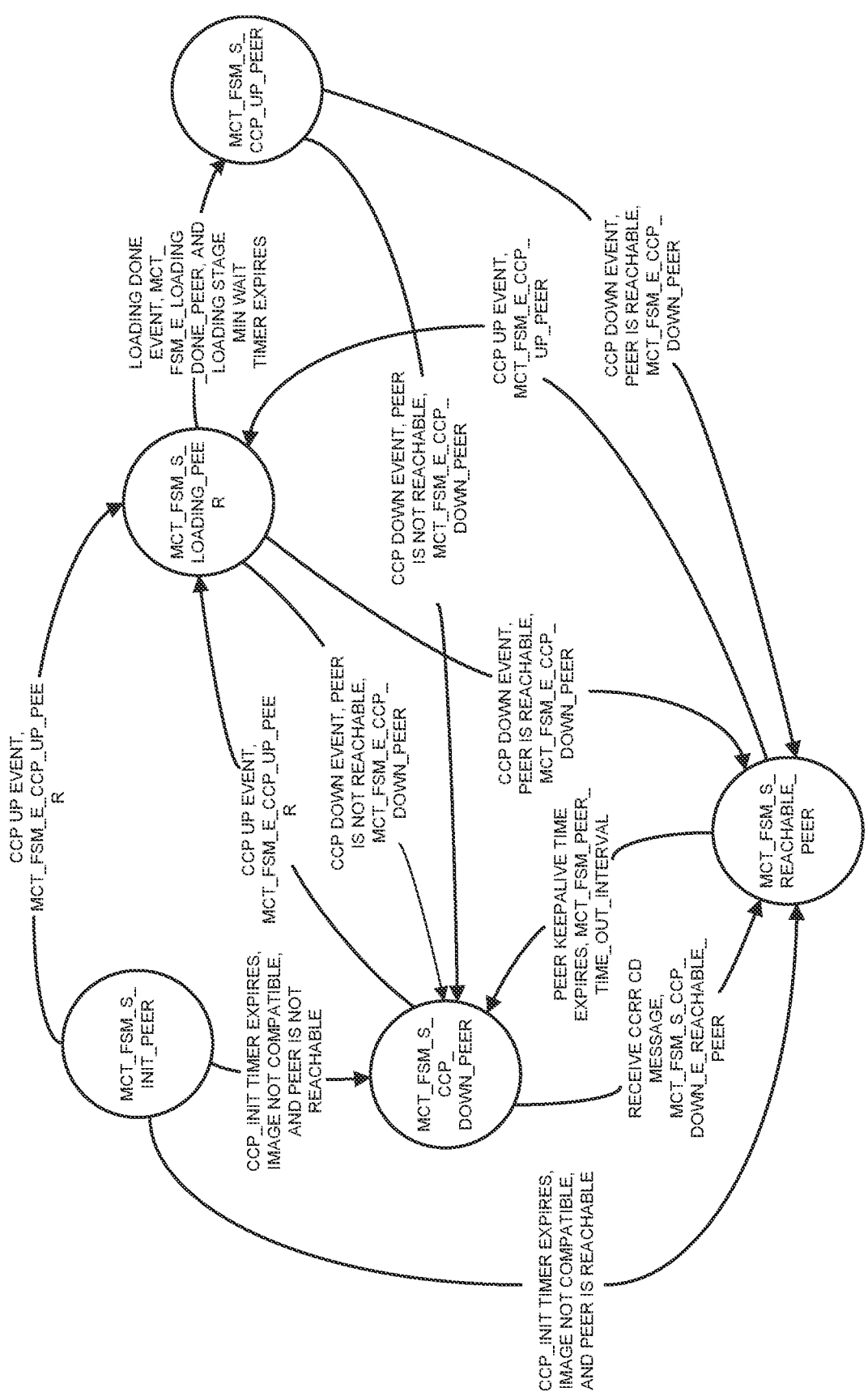
FIG. 6 is a drawing illustrating an example of a peer state machine in accordance with an embodiment of the present disclosure.

The peer state machine may be a per-peer state machine that describes the role of a computer network device in a cluster. This is illustrated in Table 3. For example, MCT_FSM_S_REACHABLE_PEER means a node does not have cluster control protocol communication with the peer node. However, its secondary communication channel with the peer switch may be up (i.e., it can still reach peer switch using a cluster client rbridge reachability (CCRR) CD message through a management virtual local area network). FIG. 6 presents a drawing illustrating an example of a peer state machine in accordance with an embodiment of the present disclosure.

Figure 7:
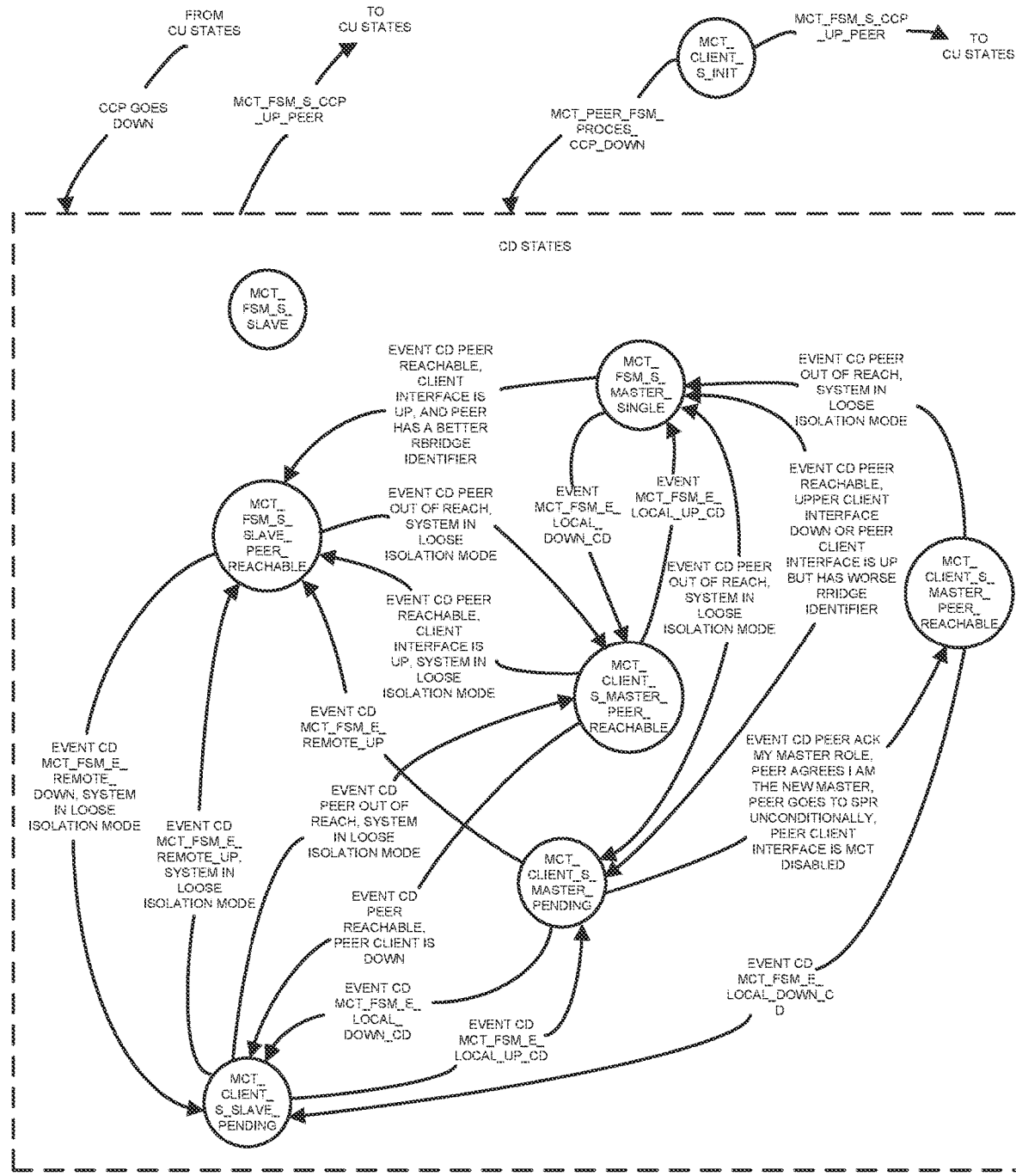
FIG. 7 is a drawing illustrating an example of a portion of a client state machine in accordance with an embodiment of the present disclosure.
Figure 8:
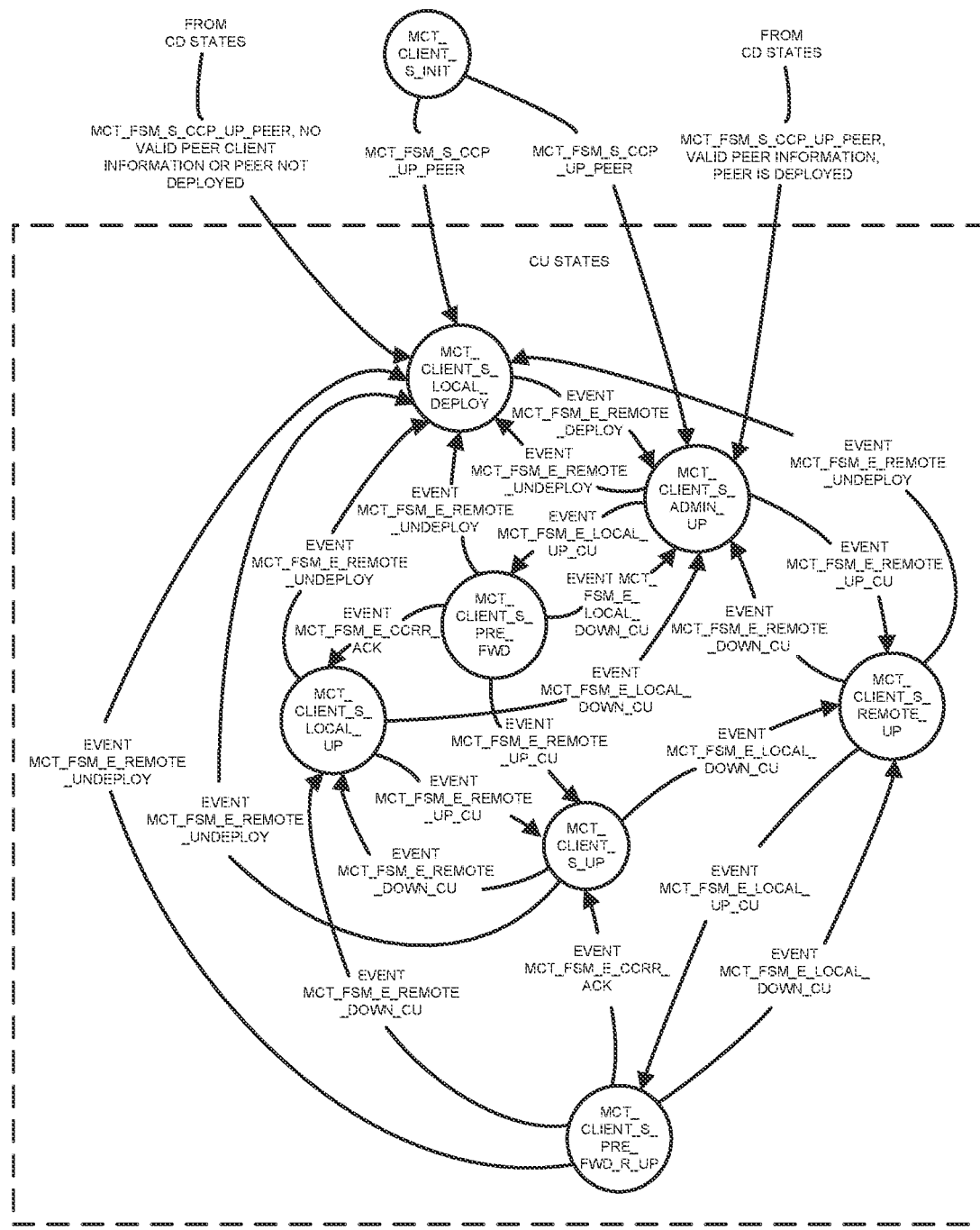
FIG. 8 is a drawing illustrating an example of a portion of a client state machine in accordance with an embodiment of the present disclosure.

TABLE 3 typedef enum _MCT_FSM_STATE_PEER_
{
   MCT_FSM_S_NO_STATE_PEER = 0x0,
   MCT_FSM_S_INIT_PEER = 0x1,
   MCT_FSM_S_LOADING_PEER = 0x2,
   MCT_FSM_S_CCP_UP_PEER = 0x3,
   MCT_FSM_S_CCP_DOWN_PEER = 0x4,
   MCT_FSM_S_REACHABLE_PEER = 0x5,
} MCT_FSM_STATE_PEER;

Each of the clients may run its own micro-state state machine. The inputs of the client state machine may include: the local deploy status and configuration; the local client interface status (such as the operational status, depending on link aggregation control protocol, unidirectional link detection, link operations, administration and management, and link status of the client interface); the peer state-machine state (CCP Up, loading, CCP down, etc.); the peer interface status of a client (as well as the operational status); message(s) between peers; and/or local timers. FIGS. 7 and 8 present drawings illustrating examples of portions of a client state machine in accordance with an embodiment of the present disclosure. Note that a part of the client state machine (the CU state machine shown in FIG. 8) uses CCP as a communication channel, and another part (the CD state machine shown in FIG. 7) uses CCRR CD message.

The forwarding behavior of a client is described by fsm_state_lp, and the forwarding state setting application programming interface MCT_SET_CLIENT_PORT_FWD_STATE sets the access control list to achieve the specific egress forwarding behavior. Moreover, the MCT_FSM_S_LP_NONE_TO_CCEP state provides total isolation. No traffic can be forwarded out to this client. Furthermore, in the MCT_FSM_S_LP_CEP_TO_CCEP state (which is also known as an inter-chassis-link suppression state), a local client edge port (CEP) can be forwarded to this client, and other local cluster CEP (CCEP) ports can forward traffic to this client interface. However, no inter-chassis link is provided to this CCEP forwarding. Additionally, in the MCT_FSM_S_LP_ICL_AND_CEP_TO_CCEP/MCT_FSM_S_LP_NO_STATE, all the local CEP, local client interfaces and the inter-chassis link can forward traffic to this client.

An aspect of the client state-machine design is its micro state (MCT_CLIENT→CLIENT_MICRO_ST). However, the client state machine also maintains the main state (MCT_CLIENT→FSM_STATE_MAIN) and the CU, CD states in order to better describe and to provide backward compatibility with the previous design. Design wise, the micro state may be sufficient and it may also enable the graceful switchover design. When we talk about the active unit and the standby unit being synchronized for MCT, basically we are indicating that the micro states of the clients need to be synchronized. If that is achieved and the standby unit turns into the active unit, it will have no impact on the user experience.

Tables 4 and 5 provide an example of micro states for a client. For example, for a micro state MCT_CLIENT_S_MASTER_PEER_REACHABLE, its main state may be MCT_FSM_S_CCP_DOWN, its CU state may not be defined (MCT_FSM_S_NO_STATE_CU, because it is not running the CU state machine), and its CD state may be MCT_FSM_S_MASTER. In Table 4 the following abbreviations are used: slave single (SS), slave pending (SPi), slave peer reachable (SPR), master single (NMS), master peer reachable (MPR), local deploy (LD), administrator up (AP), remote up (RU), local up (LU), up date (UP), pre-forwarding remote up (PFwRU), and pre-forwarding (PFw).

TABLE 4

| Client Micro State (MCT_CLIENT→CLIENT_MICRO_S) | Client Main State (MCT_CLIENT→FSM_STATE_MAIN) | Client CU State (MCT_CLIENT→FSM_STATE_CU) | Client CD State (MCT_CLIENT→FSM_STATE_CD) | Forwarding Behavior (MCT_CLIENT→FSM_CLIENT_LP) and Client Interface Spanning Tree Status Setting |
|---|---|---|---|---|
| MCT_CLIENT_S_NO_STATE (0 x 01) | MCT_FSM_S_INIT | MCT_FSM_S_NO_STATE_CU | MCT_FSM_S_NO_STATE_CD | MCT_FSM_S_LP_NONE_TO_CCEP & blocking |

TABLE 4-continued

| Client Micro State (MCT_CLIENT->CLIENT_MICRO_S) | Client Main State (MCT_CLIENT->FSM_STATE_MAIN) | Client CU State (MCT_CLIENT->FSM_STATE_CU) | Client CD State (MCT_CLIENT->FSM_STATE_CD) | Forwarding Behavior (MCT_CLIENT->FSM_CLIENT_LP) and Client Interface Spanning Tree Status Setting |
|---|---|---|---|---|
| MCT_CLIENT_S_SLAVE_SINGLE (0 × 02, SS) | MCT_FSM_S_CCP_DOWN | MCT_FSM_S_NO_STATE_CU | MCT_FSM_S_SLAVE | MCT_FSM_S_LP_NONE_TO_CCEP & blocking |
| MCT_CLIENT_S_SLAVE_PENDING (0 × 03, SP) | MCT_FSM_S_CCP_DOWN | MCT_FSM_S_NO_STATE_CU | MCT_FSM_S_SLAVE | MCT_FSM_S_LP_NONE_TO_CCEP & blocking |
| MCT_CLIENT_S_SLAVE_PEER_REACHABLE (0 × 04, SPR) | MCT_FSM_S_CCP_DOWN | MCT_FSM_S_NO_STATE_CU | MCT_FSM_S_SLAVE | MCT_FSM_S_LP_NONE_TO_CCEP & blocking |
| MCT_CLIENT_S_SLAVE_SINGLE_ISOLATE (0 × 05) | MCT_FSM_S_CCP_DOWN | MCT_FSM_S_NO_STATE_CU | MCT_FSM_S_SLAVE | MCT_FSM_S_LP_NONE_TO_CCEP & blocking |
| MCT_CLIENT_S_MASTER_SINGLE (0 × 06) | MCT_FSM_S_CCP_DOWN | MCT_FSM_S_NO_STATE_CU | MCT_FSM_S_MASTER | MCT_FSM_S_LP_CEP_TO_CCEP & forwarding |
| MCT_CLIENT_S_MASTER_PENDING (0 × 07) | MCT_FSM_S_CCP_DOWN | MCT_FSM_S_NO_STATE_CU | MCT_FSM_S_SLAVE | MCT_FSM_S_LP_NONE_TO_CCEP & blocking |
| MCT_CLIENT_S_MASTER_PEER_REACHABLE (0 × 08) | MCT_FSM_S_CCP_DOWN | MCT_FSM_S_NO_STATE_CU | MCT_FSM_S_MASTER | MCT_FSM_S_LP_CEP_TO_CCEP & forwarding |
| MCT_CLIENT_S_UNDEPLOY (0 × 09) | MCT_FSM_S_NO_STATE | MCT_FSM_S_NO_STATE_CU | MCT_FSM_S_NO_STATE_CD | MCT_FSM_S_LP_NO_STATE & blocking |
| MCT_CLIENT_S_LOCAL_DEPLOY (0 × 0a) | MCT_FSM_S_CCP_UP | MCT_FSM_S_LOCAL_DEPLOY | MCT_FSM_S_NO_STATE_CD | MCT_FSM_S_LP_NONE_TO_CCEP & blocking |
| MCT_CLIENT_S_ADMIN_UP (0 × 0b) | MCT_FSM_S_CCP_UP | MCT_FSM_S_ADMIN_UP | MCT_FSM_S_NO_STATE_CD | MCT_FSM_S_LP_NONE_TO_CCEP & blocking |
| MCT_CLIENT_S_REMOTE_UP (0 × 0c) | MCT_FSM_S_CCP_UP | MCT_FSM_S_REMOTE_UP | MCT_FSM_S_NO_STATE_CD | MCT_FSM_S_LP_NONE_TO_CCEP & blocking |
| MCT_CLIENT_S_PRE_FWD_R_UP (0 × 0d) | MCT_FSM_S_CCP_UP | MCT_FSM_S_PRE_FWD_R_UP | MCT_FSM_S_NO_STATE_CD | MCT_FSM_S_LP_NONE_TO_CCEP & blocking |
| MCT_CLIENT_S_PRE_FWD (0 × 0e) | MCT_FSM_S_CCP_UP | MCT_FSM_S_PRE_FWD | MCT_FSM_S_NO_STATE_CD | MCT_FSM_S_LP_CEP_TO_CCEP & forwarding |
| MCT_CLIENT_S_UP (0 × 0f) | MCT_FSM_S_CCP_UP | MCT_FSM_S_UP | MCT_FSM_S_NO_STATE_CD | MCT_FSM_S_LP_CEP_TO_CCEP & forwarding |
| MCT_CLIENT_S_LOCAL_UP (0 × 00) | MCT_FSM_S_CCP_UP | MCT_FSM_S_LOCAL_UP | MCT_FSM_S_NO_STATE_CD | MCT_FSM_S_LP_ICL_AND_CEP_TO_CCEP & forwarding |

TABLE 5

| Client Micro State (MCT_CLIENT->CLIENT_MICRO_ST) | Client Interface State | Peer Client Interface Status | Peer Reachable (Through CCRR CD) |
|---|---|---|---|
| MCT_CLIENT_S_NO_STATE (0 × 01) | NA | NA | No |
| MCT_CLIENT_S_SLAVE_SINGLE (0 × 02, SS) | Enable and Down | NA | No |
| MCT_CLIENT_S_SLAVE_PENDING (0 × 03, SP) | Enable and Down | Down | Yes |
| MCT_CLIENT_S_SLAVE_PEER_REACHABLE (0 × 04, SPR) | Disable | Down | Yes |
| MCT_CLIENT_S_SLAVE_SINGLE_ISOLATE (0 × 05) | Disable | Down if There is Peer | No |
| MCT_CLIENT_S_MASTER_SINGLE (0 × 06) | Enable and Up | NA | No |
| MCT_CLIENT_S_MASTER_PENDING (0 × 07) | Enable and Up | NA | Yes |
| MCT_CLIENT_S_MASTER_PEER_REACHABLE (0 × 08) | Enable and Up | Down | Yes |
| MCT_CLIENT_S_UNDEPLOY (0 × 09) | Disable | NA | N/R |
| MCT_CLIENT_S_LOCAL_DEPLOY (0 × 0a) | disable | NA | N/R |
| MCT_CLIENT_S_ADMIN_UP (0 × 0b) | Enable and Down | down | N/R |
| MCT_CLIENT_S_REMOTE_UP (0 × 0c) | Enable and Down | Up | N/R |
| MCT_CLIENT_S_PRE_FWD_R_UP (0 × 0d) | Enable and Up | Up | N/R |
| MCT_CLIENT_S_PRE_FWD (0 × 0e) | Enable and Up | Down | N/R |
| MCT_CLIENT_S_UP (0 × 0f) | Enable and Up | Up | N/R |
| MCT_CLIENT_S_LOCAL_UP (0 × 00) | Enable and Up | Down | N/R |

In some embodiments, aspects of the state machine may involve special handling. Notably, the client in the local deploy (CU) state may have to administratively disable the client interface. For a client going through a CD to a CU transition, if it has to go through the local deploy state, there may still be traffic drop for the customer for this local deploy state. If the client interface uses a link aggregation control protocol, the link aggregation control protocol lag may need to be reestablished and that may lead to traffic drop (e.g., for 6 s).

Therefore, there may be a mechanism to skip the local deploy state once the cluster gets the CCP up event. Notably, in a regular CU state machine, once the client is in the local deploy state, it may get a CCRR CU message about the remote client that is deployed. It can go to the administrator up state, which will allow the administrator to enable the client interface.

The CCP up state of the peer state machine and the CCP up event for the client state machine may be different. Notably, once the peer state machine gets CCP up from the CCP, it may transition to a loading state. During peer state machine loading, it may only take a CCRR CU message for deployment. When the loading is completed, the client state machine provides CCP up, and the client goes from an initial state or a CD state to one of: a local deploy state (MCT_CLIENT_S_LOCAL_DEPLOY, when there is no valid peer client information, and when the peer client is not deployed) or an administrator up state (MCT_CLIENT_S_ADMIN_UP, when there is valid peer client information and the peer client is deployed, and the local client is administrator enabled and is not up), or a pre-forwarding state (MCT_CLIENT_S_PRE_FWD, when there is valid peer client information and the peer client is deployed, and the local client is administrator enabled and is not up).

When the client in the main state (CCP DOWN state), it can still process a CCRR CU message. However, the client may be limited to a deployment field, but may not go to CU states.

In the switchover techniques, a propose and agree mechanism may be introduced into the CD state machine in order to bring the master node into MPR state as rapidly as possible so that traffic loss is minimized. For a node in an MPi state, in order to go MPR, it may take, e.g., a 2 s wait while the timer expires. In order to safely fast track the process, the idea is to introduce a handshake mechanism. For the node in MPi state, a proposal CCRR CD message may be sent to its peer. If the peer is already in an SPR state, it will response with a CCRR CD message with an agree bit on and the first node can just go from MPi to MPR directly instead of waiting for the wait-while timer to expire.

Moreover, for a cluster, the CCP up event may come from the CCP. When the CCP protocol is up, the CCP up event for the cluster may be an input event for its peer state machine. The peer state machine may enter the loading state (MCT_FSM_S_LOADING_PEER) after it gets the CCP up event. Then, it may start to exchange information like virtual local area network masks and a router interface MAC address with its MCT peer (this process is sometimes referred to as a 'loading process'). After the loading process is completed, the peer state machine may enter a CCP up state (MCT_FSM_S_CCP_UP_PEER).

For the client, its CCP up event may come from the peer state machine for the cluster instead of the real CCP channel. It is actually a peer stat machine entering CCP up state event, to differentiate it from the previous CCP up event (it may sometimes be referred to as a client CCP up event). Stated differently, when the peer state machine enters the CCP up state (MCT_FSM_S_CCP_UP_PEER) from the loading state, it triggers the client CCP up event for all of the clients. In case the peer state machine for the cluster goes to the CCP up state (MCT_FSM_S_CCP_UP_PEER) before the client is even deployed, the client may process the CCP up event during client deployment.

Note that for a client to get the CCP up event, its main state may be MCT_FSM_S_CCP_UP and it may run the CU state machine.

Thus, the client enters the CCP up state later than when the actual CCP gets established and the peer state machine starts loading. During the loading state of the peer state machine, the actual CCP is already up and the peer state machine relies on the CCP to exchange information while the client still runs the CD states (MCT_FSM_S_CCP_DOWN) or an initial state (MCT_FSM_S_NIT).

If you have a cluster made out of switch A and B, and you reload switch B, then switch B will come up with all clients in the MCT_FSM_S_INIT state. Moreover, if the CCRR CD message gets through before the CCP comes up, then switch B may go to the CD state machine. Then, after the CCP comes up, it will go to the CU state machine. The design puts extra effort into preventing this from happening, because in the CD states at most one side can provide service to the customer client, while in the CU state both clusters can forward traffic for the client. Consequently, CU states may be preferred to CD states.

One design feature helps to make sure CCP comes up before the system enters the CD state machine is a CCP initial timer. There are two kinds of CCP initial timers, one for the peer state machine, and another is the per-client CCP initial timer.

The peer CCP initial timer (MCT_PEER→FSM_ENABLE_CCP_INIT_TIMER) starts when the cluster is deployed. It will prevent the peer going to the CD states (MCT_FSM_S_CCP_DOWN_PEER or MCT_FSM_S_REACHABLE_PEER) before this timer expires (MCT_PEER→FSM_MAX_CCP_INIT_TIMER, which can be MCT_FSM_CCP_INIT_TIME_OUT_INTERVAL (120 s) or MCT_FSM_CCP_INIT_TIME_OUT_INTERVAL(3 s) or 9-MCT_FSM_CCP_INIT_TIME_OUT_INTERVAL_VE_DOWN depending on the virtual local area network interface (VE) states of the management virtual local area network and other factors).

However, this timer may have no effect if the compatibility check fails (MCT version, hardware capability and board type check). In this case, the peer state machine may trigger a CCP down event and enters the CD state right away.

We now describe the repainting or reprogramming logic. No matter how sophisticated the hot standby design is, there is always be possibility that the standby unit and the active unit are actually out of synchronization when switchover happens. Notably, because switchover is not always managed, a last-minute transaction can cause the views of the active unit and the standby unit to be different. Stated differently, because the active unit and the standby unit run the control protocol independently, an out-of-synchronization condition is normal.

In the switchover techniques, the active unit and the standby unit are actual stacking units which also have physical ports on them. Consequently, when the node crash, those ports will have a link down event and will trigger the state-machine transition. Because this out-of-synchronization condition is inevitable, in the switchover techniques we focus on how to handle this inevitable condition instead of trying to prevent it.

When the standby unit turns into the active unit, its view (the system control view) may be different from the actual hardware. For example, in view of the new active unit, port 1/1/1 may be blocking, while in the actual hardware the setting of port 1/1/1 may be forwarding. As the new active unit, it needs to correct the settings that are out of synchronization with the hardware condition. This process is sometimes referred to as 're-painting.' Basically, the new active unit uses its active view (the system control view) to re-write the system hardware to make sure hardware and its view are synchronized.

In some platforms, it is possible for the new active unit to know which ports are out of synchronization and which are not after it turns into the new active unit. However, other stacking systems may not have this capability. In these cases, the new active unit may not know the out-of-synchronization ports (except for those ports that reside on the new active unit itself), so the majority of the repaint design will have to happen at the linecard control layer (or hardware abstraction layer) at each stacking unit. At the same time, the linecard controller is mostly MCT unaware. It knows the port forwarding/blocking status (which is shared with all L2 control protocols, such as the spanning tree protocol, MRP, virtual switch redundancy protocol and L2 link level protocols, e.g., unidirectional link detection, link operations, administration and management, and a link aggregation control protocol), enable/disable status (which is shared with all system features), even the access control list setting for suppression (which is shared with other features that may use the access control list), but it does not know how those setting are bound with the MCT design. Therefore, in some embodiments the repainting may have to be done by the following three areas independently.

For port enable/disable, MCT may be a protocol that can actively disable a port. If the new active unit thinks a port should be enabled, while in the hardware it is disabled, the repaint should enable that port.

Moreover, for the port spanning tree group setting, the MCT protocol may block the traffic by spanning tree group setting. In this case, the repaint may rely on the system control and linecard control spanning tree group table.

Furthermore, for the port forwarding behavior setting, the protocol setting value may be MCT_CLIENT→FM_STATE_LP.

In the switchover techniques, the repaint logic may be based at least in part on the following logic. Notably, the system control/linecard control repaint may reduce the hardware write. Instead of doing a system wise hardware re-write to make sure the new active unit is synchronized with the hardware setting, the re-painting logic based at least in part on the system control/linecard control may just download the system control view of the new active unit to the system. The linecard control module in each stacking unit (including the new active unit) may will compare this download information with its linecard control view. If the information is different, there may be a setting to correct this difference. Alternatively, if the information is the same, nothing may be done. Compared with blindly re-programming the whole hardware table solution, this process reduces the register-level operations and reduces the data-traffic disturbance.

Moreover, there may be a delayed repaint based at least in part on a delay repaint timer. Notably, in case the view of the new active unit is different from the actual hardware, the linecard controller may decide whether to set the hardware to match with the new active unit after it gets the download from the new active unit. Because we know that the standby unit behaves like a follower of the active unit, it is possible that the view of the new active unit view is behind the actual hardware setting. For example, the wait-while timer of the active unit may expire and a port may be being set as forwarding when it crashes. The wait-while timer of the standby unit may not have expired yet when it turns into the new active unit. Consequently, it may think this port is blocking. However, when the wait-while time expires, the port in current of the new active unit may change from blocking to forwarding. A port mask of the out-of-synchronization ports may be maintained for each linecard when it receives the information from the new active unit. A three seconds delay may be introduced into the linecard repaint logic, so that if, during this window, the port becomes synchronized, no repaint is needed. When this timer expires, the remaining ports in the out-of-synchronization portmask are those that need to repainted. Note that, if the new active unit thinks the port needs to be blocking/disabled while the hardware is forwarding/enabled, it may be set to blocking/disabled after the delay repaint timer expires.

In some embodiments, the switchover techniques may reduce the risk of multiple copies or an L2 loop using a delay forwarding timer. Notably, in an L2 network, we may prefer to drop some traffic than to have an L2 storm caused by an L2 loop. The switchover opens a possible window for an L2 storm if we blindly set the port to forward traffic just because the new active units thinks this is the case.

In the final out-of-synchronization portmask, after the delay repaint timer expires, another 6 s delay forwarding timer may be triggered. If the new active unit thinks the port needs to go to forwarding/enabled but the hardware is blocking/disabled, we may honor the blocking/disabled decision until the delay forwarding timer expires. During this time window, if the new active unit sets the port to map the hardware setting (which is non-forwarding), the port may be moved out of the out-of-synchronization portmask as well.

The port forwarding behavior setting may not simply be a forward blocking/forwarding or disable/enable decision. For example, it may have three values, such as: MCT_FSM_S_LP_NONE_TO_CCEP, MCT_FSM_S_LP_CEP_TO_CCEP, or MCT_FSM_S_LP_ICL_AND_CEP_TO_CCEP. The criterion may treat MCT_FSM_S_LP_NONE_TO_CCEP as blocking, and may treat MCT_FSM_S_LP_ICL_AND_CEP_TO_CCEP and MCT_FSM_S_LP_CEP_TO_CCEP as forwarding.

In MCT, the MAC address/forwarding database (FDB) entry generation may be a little bit different from a non-MCT virtual local area network. The neighbor advertisement and MAC flush may work directly on the modular database (MDB) instead of the forwarding database. Notably, there may be a local modular database generated from the local MAC messages and a remote modular database learned from the message handling system directory user package messages. The forwarding database may be a combined result of the local modular database and the remote modular database.

For hitless design, the forwarding database entries on a non-MCT virtual local area network may use entry to entry to synchronize between the active unit and the standby unit. This is different from the MCT state-machine state design in which the MCT instance running on the standby unit uses bi-cast to converge.

In some embodiments, for the forwarding database entries on the MCT virtual local area network, there may be several solutions. Notably, there may not be a modular database on the standby unit. When the standby unit turns into the active unit, a modular database may be difficult to form because the local neighbor advertisement may not come with a forwarding database installed pointing to the CCEP ports.

Alternative, in a bi-cast solution, the standby unit learns the local modular database through a MAC learning process. Basically, all MAC messages are bi-cast to the standby unit, which calculates the modular database. Consequently, the standby unit learns the remote modular database through the bi-cast of the message handling system directory user package messages. Then, the standby unit combines the local modular database and the remote modular database and forms a forwarding database entry.

However, based on the early study of forwarding database hitless solution, we know that this may not work. Notably, the timing difference between the active unit and the standby unit may cause the forwarding database entries index to be different for the active unit and the standby unit.

In some embodiments, an entry-to-entry synchronization solution may be used. Notably, the standby unit may not process the neighbor advertisement message from the MCT virtual local area network, and the standby unit may not process a flush operation for MCT virtual local area network.

Instead, there may be entry-to-entry synchronization for the forwarding database entries on the MCT virtual local area network just like those forwarding-database entries on a non-MCT virtual local area network. However, the synchronization message may now contain the information for the two modular database entries for each forwarding database in case the entry is on the MCT virtual local area network. The standby unit may just take the synchronization information and may form the forwarding-database entries and modular-database entries using the information from the synchronization message from the active unit.

In some embodiments, the solution may limit the changes. Notably, all existing MAC address tables may synchronize, as this just adds fields of the modular database in the synchronization entry. The receiving side may use the modular-database information to construct the modular-database and forwarding-database entries.

We now describe embodiments of an electronic device, which may perform at least some of the operations in the stacking techniques. FIG. 9 presents a block diagram illustrating an example of an electronic device 900 in accordance with some embodiments, such as one of computer 104, the one or more computer network devices 106, controller 108, one of access points 110 or one of electronic devices 112. This electronic device includes processing subsystem 910, memory subsystem 912, and networking subsystem 914. Processing subsystem 910 includes one or more devices configured to perform computational operations. For example, processing subsystem 910 can include one or more microprocessors, ASICs, microcontrollers, programmable-logic devices, one or more graphics process units (GPUs) and/or one or more digital signal processors (DSPs).

Memory subsystem 912 includes one or more devices for storing data and/or instructions for processing subsystem 910 and networking subsystem 914. For example, memory subsystem 912 can include dynamic random access memory (DRAM), static random access memory (SRAM), and/or other types of memory. In some embodiments, instructions for processing subsystem 910 in memory subsystem 912 include: one or more program modules or sets of instructions (such as program instructions 922 or operating system 924), which may be executed by processing subsystem 910. Note that the one or more computer programs may constitute a computer-program mechanism. Moreover, instructions in the various modules in memory subsystem 912 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 910.

In addition, memory subsystem 912 can include mechanisms for controlling access to the memory. In some embodiments, memory subsystem 912 includes a memory hierarchy that comprises one or more caches coupled to a memory in electronic device 900. In some of these embodiments, one or more of the caches is located in processing subsystem 910.

In some embodiments, memory subsystem 912 is coupled to one or more high-capacity mass-storage devices (not shown). For example, memory subsystem 912 can be coupled to a magnetic or optical drive, a solid-state drive, or another type of mass-storage device. In these embodiments, memory subsystem 912 can be used by electronic device 900 as fast-access storage for often-used data, while the mass-storage device is used to store less frequently used data.

Networking subsystem 914 includes one or more devices configured to couple to and communicate on a wired and/or wireless network (i.e., to perform network operations), including: control logic 916, an interface circuit 918 and one or more antennas 920 (or antenna elements). (While FIG. 9 includes one or more antennas 920, in some embodiments electronic device 900 includes one or more nodes, such as nodes 908, e.g., a network node that can be coupled or connected to a network or link, or an antenna node, connector or a metal pad that can be coupled to the one or more antennas 920. Thus, electronic device 900 may or may not include the one or more antennas 920.) For example, networking subsystem 914 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, a cable modem networking system, and/or another networking system.

Note that a transmit or receive antenna pattern (or antenna radiation pattern) of electronic device 900 may be adapted or changed using pattern shapers (such as reflectors) in one or more antennas 920 (or antenna elements), which can be independently and selectively electrically coupled to ground to steer the transmit antenna pattern in different directions. Thus, if one or more antennas 920 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 900 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 914 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 900 may use the mechanisms in networking subsystem 914 for performing simple wireless communication between the electronic devices, e.g., transmitting advertising or beacon frames and/or scanning for advertising frames transmitted by other electronic devices as described previously.

Within electronic device 900, processing subsystem 910, memory subsystem 912, and networking subsystem 914 are coupled together using bus 928. Bus 928 may include an electrical, optical, and/or electro-optical connection that the subsystems can use to communicate commands and data among one another. Although only one bus 928 is shown for clarity, different embodiments can include a different number or configuration of electrical, optical, and/or electro-optical connections among the subsystems.

In some embodiments, electronic device 900 includes a display subsystem 926 for displaying information on a display, which may include a display driver and the display, such as a liquid-crystal display, a multi-touch touchscreen, etc.

Electronic device 900 can be (or can be included in) any electronic device with at least one network interface. For example, electronic device 900 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, a computer network device, a stack of multiple computer network devices, a controller, test equipment, an Internet-of-Things (IoT) device, and/or another electronic device.

Although specific components are used to describe electronic device 900, in alternative embodiments, different components and/or subsystems may be present in electronic device 900. For example, electronic device 900 may include one or more additional processing subsystems, memory subsystems, networking subsystems, and/or display subsystems. Additionally, one or more of the subsystems may not be present in electronic device 900. Moreover, in some embodiments, electronic device 900 may include one or more additional subsystems that are not shown in FIG. 9. Also, although separate subsystems are shown in FIG. 9, in some embodiments some or all of a given subsystem or component can be integrated into one or more of the other subsystems or component(s) in electronic device 900. For example, in some embodiments program instructions 922 are included in operating system 924 and/or control logic 916 is included in interface circuit 918. In some embodiments, the switchover techniques are implemented using information in L1, L1.5 and/or L2 of an Open Systems Interconnection (OSI) model.

Moreover, the circuits and components in electronic device 900 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of electronic device 900 and/or networking subsystem 914. The integrated circuit may include hardware and/or software mechanisms that are used for transmitting wireless signals from electronic device 900 and receiving signals at electronic device 900 from other electronic devices. Aside from the mechanisms herein described, radios are generally known in the art and hence are not described in detail. In general, networking subsystem 914 and/or the integrated circuit can include any number of radios. Note that the radios in multiple-radio embodiments function in a similar way to the described single-radio embodiments.

In some embodiments, networking subsystem 914 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Ethernet and a Wi-Fi communication protocol as an illustrative example, in other embodiments a wide variety of communication protocols and, more generally, wired and/or wireless communication techniques may be used. Thus, the switchover techniques may be used with a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the switchover techniques may be implemented using program instructions 922, operating system 924 (such as a driver for interface circuit 918) or in firmware in interface circuit 918. Alternatively or additionally, at least some of the operations in the switchover techniques may be implemented in a physical layer, such as hardware in interface circuit 918.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the switchover techniques, different numerical values may be used. Furthermore, while particular communication protocols (such as CCP) between components in the stacking system are described in the preceding discussion, more generally the switchover techniques may be used with a wide variety of communication protocols.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A stacking system, comprising:
an active computer network device configured to execute software for control protocols and user configuration of the stacking system; and
a standby computer network device configured to provide switchover backup for the active computer network device, wherein, when a switchover from the active computer network device to the standby computer network device occurs, at least the standby computer network device is configured to perform an action based at least in part on differences between system control tables for the active computer network device and the standby computer network device;
wherein the action comprises: reprograming at least part of the system control tables; reprogramming at least part of hardware in the stacking system; or downloading at least the part of the system control tables to the hardware;
wherein the system control tables comprise: a media access control (MAC) address table, a spanning tree group table, a link aggregation group table, or a port table with information associated with ports;
wherein the stacking system is configured to run the active computer network device and the standby computer network device independently, and ignore consistent and continuous out-of-synchronization conditions between the active computer network device and the standby computer network device; and
wherein, when the stacking system switches over from the active computer network device to the standby computer network device, the standby computer network device is configured to repaint states of stacking units in the stacking system based at least in part on a state table that defines states and associated state setting requirements.

2. The stacking system of claim 1, wherein the stacking system implements a control protocol that is configured to protect against loops in a network by blocking ports, and that is configured to relearn network topologies when a link in the network fails; and
wherein the control protocol is different from a spanning tree protocol.

3. The stacking system of claim 2, wherein the control protocol comprises multi-chassis trunking (MCT).

4. The stacking system of claim 1, wherein the active computer network device and the standby computer network device have state machines for the stacking system that are based at least in part on a topology of the stacking system, so that the state machines converge to a common state even if the active computer network device and the standby computer network device execute different sequences of events; and
wherein the topology of the stacking system comprises the user configuration and link events.

5. The stacking system of claim 1, wherein the stacking system is configured to bi-cast control packets to the active computer network device and the standby computer network device.

6. The stacking system of claim 1, wherein the port table specifies a subset of the ports that are enabled and a subset of the ports that are disabled.

7. The stacking system of claim 1, wherein the spanning tree group table specifies blocking or forwarding of traffic and the link aggregation group table specifies a group of ports that are aggregated into a link.

8. The stacking system of claim 1, wherein the action does not affect all of the system control tables.

9. The stacking system of claim 8, wherein the action only affects the portion of the system control tables, and the portion of the system control tables comprises the link aggregation group table and the spanning tree group table.

10. The stacking system of claim 1, wherein the stacking system is configured to implement distributed standby in which multiple computer network devices in the stacking system are configured to provide standby backup for the active computer network device.

11. The stacking system of claim 10, wherein the action comprises downloading at least the portion of the system control tables to the multiple computer network devices, which are configured to reprogram at least the portion of the system control tables or the hardware based at least in part on at least the downloaded portion of the system control tables.

12. The stacking system of claim 1, wherein the standby computer network device is configured to delay, for a time interval, reprogramming of the spanning tree group table in order to avoid a layer 2 (L2) loop condition.

13. A non-transitory computer-readable storage medium for use in conjunction with a stacking system, the computer-readable storage medium storing program instructions that, when executed by the stacking system, cause the stacking system to perform operations comprising:
when a failure or administrative shutdown of an active computer network device in the stacking system occurs, performing a switchover from the active computer network device to a standby computer network device in the stacking system, wherein the active computer network device executes software for control protocols and user configuration of the stacking system; and
performing, at least by the standby computer network device, an action based at least in part on differences between system control tables for the active computer network device and the standby computer network device, wherein the action comprises: reprograming at least part of the system control tables; reprogramming at least part of hardware in the stacking system; or downloading at least the part of the system control tables to the hardware;
wherein the system control tables comprise: a media access control (MAC) address table, a spanning tree group table, a link aggregation group table, or a port table with information associated with ports;
wherein the stacking system runs the active computer network device and the standby computer network device independently, and ignores consistent and continuous out-of-synchronization conditions between the active computer network device and the standby computer network device; and wherein, when the stacking system switches over from the active computer network device to the standby computer network device, the standby computer network device repaints states of stacking units in the stacking system based at least in part on a state table that defines states and associated state setting requirements.

14. The non-transitory computer-readable storage medium of claim 13, wherein the stacking system implements a control protocol that is configured to protect against loops in a network by blocking ports, and that is configured to relearn network topologies when a link in the network fails; and wherein the control protocol is different from a spanning tree protocol.

15. The non-transitory computer-readable storage medium of claim 13, wherein the control protocol comprises multi-chassis trunking (MCT).

16. The non-transitory computer-readable storage medium of claim 13, wherein the action does not affect all of the system control tables.

17. The non-transitory computer-readable storage medium of claim 16, wherein the action only affects the portion of the system control tables, and the portion of the system control tables comprises the link aggregation group table and the spanning tree group table.

18. The non-transitory computer-readable storage medium of claim 13, wherein the stacking system is configured to implement distributed standby in which multiple computer network devices in the stacking system are configured to provide standby backup for the active computer network device; and wherein the action comprises downloading at least the portion of the system control tables to the multiple computer network devices, which are configured to reprogram at least the portion of the system control tables or the hardware based at least in part on at least the downloaded portion of the system control tables.

19. A method for performing a switchover in a stacking system, comprising:

by at least a standby computer network device in the stacking system:

when a failure or an administrative shutdown of an active computer network device in the stacking system occurs, performing the switchover from the active computer network device to the standby computer network device in the stacking system, wherein the active computer network device executes software for control protocols and user configuration of the stacking system; and performing, at least by the standby computer network device, an action based at least in part on differences between system control tables for the active computer network device and the standby computer network device, wherein the action comprises: reprograming at least part of the system control tables; reprogramming at least part of hardware in the stacking system; or downloading at least the part of the system control tables to the hardware;

wherein the system control tables comprise: a media access control (MAC) address table, a spanning tree group table, a link aggregation group table, or a port table with information associated with ports;

wherein the stacking system runs the active computer network device and the standby computer network device independently, and ignores consistent and continuous out-of-synchronization conditions between the active computer network device and the standby computer network device; and wherein, when the stacking system switches over from the active computer network device to the standby computer network device, the standby computer network device repaints states of stacking units in the stacking system based at least in part on a state table that defines states and associated state setting requirements.

20. The method of claim 19, wherein the stacking system implements a control protocol that is configured to protect against loops in a network by blocking ports, and that is configured to relearn network topologies when a link in the network fails;

wherein the control protocol is different from a spanning tree protocol.

* * * * *